(12) United States Patent
Yu et al.

(10) Patent No.: US 12,353,536 B2
(45) Date of Patent: Jul. 8, 2025

(54) ELECTRONIC DEVICE AND OPERATING METHOD FOR PROVIDING AN OPERATING NOTIFICATION FOR DEVICE INCLUDED IN THE ELECTRONIC DEVICE

(71) Applicant: SAMSUNG ELECTRONICS CO., LTD., Suwon-si (KR)

(72) Inventors: Hyungseok Yu, Suwon-si (KR); Taeho Kim, Suwon-si (KR); Jungmin Park, Suwon-si (KR); Hyun Seo, Suwon-si (KR); Shinjae Lee, Suwon-si (KR); Kwangsik Choi, Suwon-si (KR); Seyoung Choi, Suwon-si (KR); Yurak Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 17/866,760

(22) Filed: Jul. 18, 2022

(65) Prior Publication Data
US 2023/0024628 A1    Jan. 26, 2023

Related U.S. Application Data

(63) Continuation of application No. PCT/KR2022/009831, filed on Jul. 7, 2022.

(30) Foreign Application Priority Data
Jul. 23, 2021    (KR) .................. 10-2021-0097365

(51) Int. Cl.
*G06F 21/44*        (2013.01)
*G06F 9/455*        (2018.01)
*G06F 21/53*        (2013.01)

(52) U.S. Cl.
CPC .......... *G06F 21/44* (2013.01); *G06F 9/45558* (2013.01); *G06F 21/53* (2013.01);
(Continued)

(58) Field of Classification Search
None
See application file for complete search history.

(56) References Cited

U.S. PATENT DOCUMENTS

2006/0047958 A1*  3/2006  Morais ................ G06F 21/51
                                                        713/166
2010/0229168 A1*  9/2010  Maeda ................ G06F 9/4856
                                                        718/1
(Continued)

FOREIGN PATENT DOCUMENTS

JP    2020-095396 A    6/2020
JP    2021-039600 A    3/2021
(Continued)

*Primary Examiner* — William J. Goodchild
(74) *Attorney, Agent, or Firm* — Nixon & Vanderhye P.C.

(57) ABSTRACT

An electronic device may include a memory and at least one processor operatively connected with the memory. The at least one processor, including processing circuitry, may run a user application in a first area operating with a first permission and run an operating system in a second area operating with a second permission higher than the first permission. The memory stores instructions configured to, when executed, cause the at least one processor to detect an operation of at least one first device included in the electronic device, in a third area operating with a third permission higher than the second permission, deliver a detection signal for the at least one first device to a fourth area, an execution environment of which is separated from the first area, the second area, and the third area, in the third area, and provide a notification that the at least one first device is operating using at least one specified second device, in the fourth area. The fourth area may be an area on a second (Continued)

virtual machine, an execution environment of which is separated from the first area and the second area being areas on a first virtual machine by a hypervisor executed in the third area.

20 Claims, 13 Drawing Sheets

(52) U.S. Cl.
CPC .............. *G06F 2009/45587* (2013.01); *G06F 2221/2113* (2013.01)

(56) References Cited

U.S. PATENT DOCUMENTS

| | | | |
|---|---|---|---|
| 2014/0201743 A1* | 7/2014 | Ali | G06F 21/57 |
| | | | 718/1 |
| 2016/0170816 A1 | 6/2016 | Warkentin et al. | |
| 2016/0314082 A1* | 10/2016 | Korkishko | G06F 21/44 |
| 2017/0075717 A1* | 3/2017 | Chen | G06F 9/45558 |
| 2020/0409740 A1 | 12/2020 | Li et al. | |
| 2021/0064770 A1 | 3/2021 | Yu et al. | |

FOREIGN PATENT DOCUMENTS

| | | |
|---|---|---|
| JP | 2021-039600 A2 | 3/2021 |
| KR | 10-2014-0108607 A | 9/2014 |
| KR | 10-2014-0112399 A | 9/2014 |
| KR | 10-2021-0026233 A | 3/2021 |

* cited by examiner

ELECTRONIC DEVICE AND OPERATING METHOD FOR PROVIDING AN OPERATING NOTIFICATION FOR DEVICE INCLUDED IN THE ELECTRONIC DEVICE

CROSS-REFERENCE TO RELATED APPLICATIONS

This application is a continuation of International Application No. PCT/KR2022/009831 designating the United States, filed on Jul. 7, 2022, in the Korean Intellectual Property Receiving Office and claiming priority to Korean Patent Application No. 10-2021-0097365, filed on Jul. 23, 2021, in the Korean Intellectual Property Office, the disclosures of which are incorporated by reference herein in their entireties.

BACKGROUND

Field

The disclosure relates to an electronic device for providing a notification that at least one device included in the electronic device is operating and an operating method thereof.

Description of Related Art

An electronic device may run at least one application in the background while running a plurality of applications. The electronic device may provide a user with a notification indicating that the application is running or a notification indicating that a device used by the application is operating, with respect to the application run in the background.

An exception level (EL) 0 area and an EL1 area of an electronic device supporting an ARM architecture may be vulnerable to security. For example, as the security of the EL0 area and the EL1 area of the electronic device is breached, when a device operates irrespective of an intention of a user of the electronic device, the electronic device needs to notify the user that the device is operating.

Furthermore, when notifying the user that the device is operating, the electronic device needs to make sure that an attacker who breaches the security of the electronic device does not know about it.

SUMMARY

Embodiments of the disclosure provide an electronic device for notifying a user that a device is operating without being not omitted even when security is breached and an operating method thereof.

In accordance with an example embodiment of the disclosure, an electronic device is provided. The electronic device may include: a memory and a processor operatively connected with the memory. The processor may run a user application in a first area operating with a first permission and may run an operating system in a second area operating with a second permission higher than the first permission. The memory may store one or more instructions configured to, when executed, cause the processor to detect an operation of at least one first device included in the electronic device, in a third area operating with a third permission higher than the second permission, deliver a detection signal for the at least one first device to a fourth area, an execution environment of which is separated from the first area, the second area, and the third area, in the third area, and provide a notification that the at least one first device is operating using at least one specified second device, in the fourth area. The fourth area may be an area on a second virtual machine, an execution environment of which is separated from the first area and the second area, which may be areas on a first virtual machine, by a hypervisor executed in the third area.

In accordance with an example embodiment of the disclosure, an electronic device is provided. The electronic device may include: a memory and a processor operatively connected with the memory. The processor may run a user application in a first area operating with a first permission and may run an operating system in a second area operating with a second permission higher than the first permission. The memory may store one or more instructions, when executed, causing the processor to detect an operation of at least one first device included in the electronic device, in a third area operating with a third permission higher than the second permission, deliver a detection signal for the at least one first device to a fourth area included in a secure world, an execution environment of which is separated from a normal world including the first area, the second area, and the third area, in the third area, and provide a notification that the at least one first device is operating using at least one specified second device, in the fourth area.

In accordance with an example embodiment of the disclosure, method of operating an electronic device is provided. The method may include: running, by a processor of the electronic device, a user application in a first area operating with a first permission and running, by the processor, an operating system in a second area operating with a second permission higher than the first permission, detecting, by the processor, an operation of at least one first device included in the electronic device, in a third area operating with a third permission higher than the second permission, delivering, by the processor, a detection signal for the at least one first device to a fourth area, an execution environment of which is separated from the first area, the second area, and the third area, in the third area, and providing, by the processor, a notification that the at least one first device is operating using at least one specified second device, in the fourth area. The fourth area may be an area on a second virtual machine, an execution environment of which is separated from the first area and the second area being areas on a first virtual machine by a hypervisor executed in the third area.

In accordance with an example embodiment of the disclosure, a method of operating an electronic device is provided. The method may include: running, by a processor of the electronic device, a user application in a first area operating with a first permission and running, by the processor, an operating system in a second area operating with a second permission higher than the first permission, detecting, by the processor, an operation of at least one first device included in the electronic device, in a third area operating with a third permission higher than the second permission, delivering, by the processor, a detection signal for the at least one first device to a fourth area included in a secure world, an execution environment of which is separated from a normal world including the first area, the second area, and the third area, in the third area, and providing, by the processor, a notification that the at least one first device is operating using at least one specified second device, in the fourth area.

According to various example embodiments disclosed in the disclosure, the electronic device and the operating method thereof may be provided to notify a user that a device is operating without being not omitted even when security is breached and an operating method thereof.

In addition, various effects ascertained directly or indirectly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar denotations may be used for the same or similar components.

DETAILED DESCRIPTION

Figure 1:
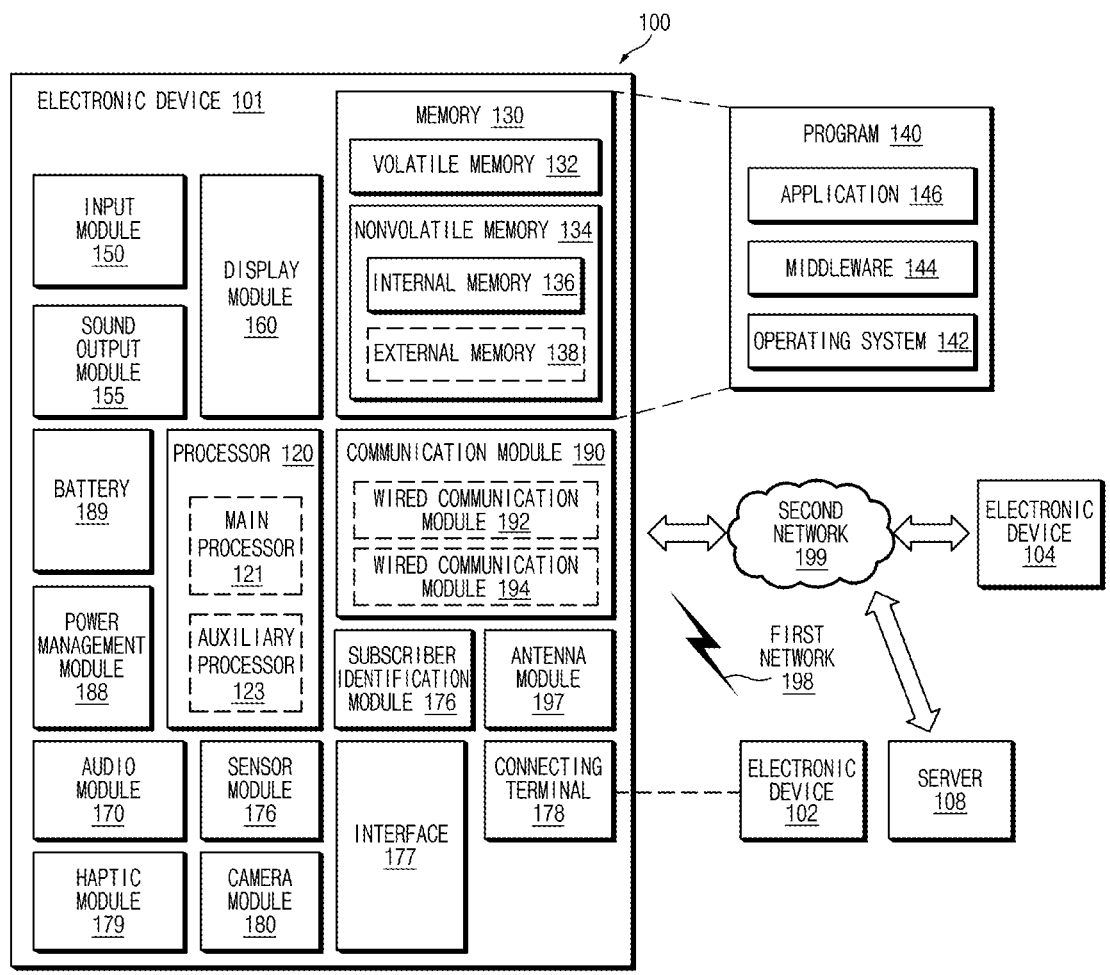
FIG. 1 is a block diagram illustrating an electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). Each "module" herein preferably comprises circuitry. A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
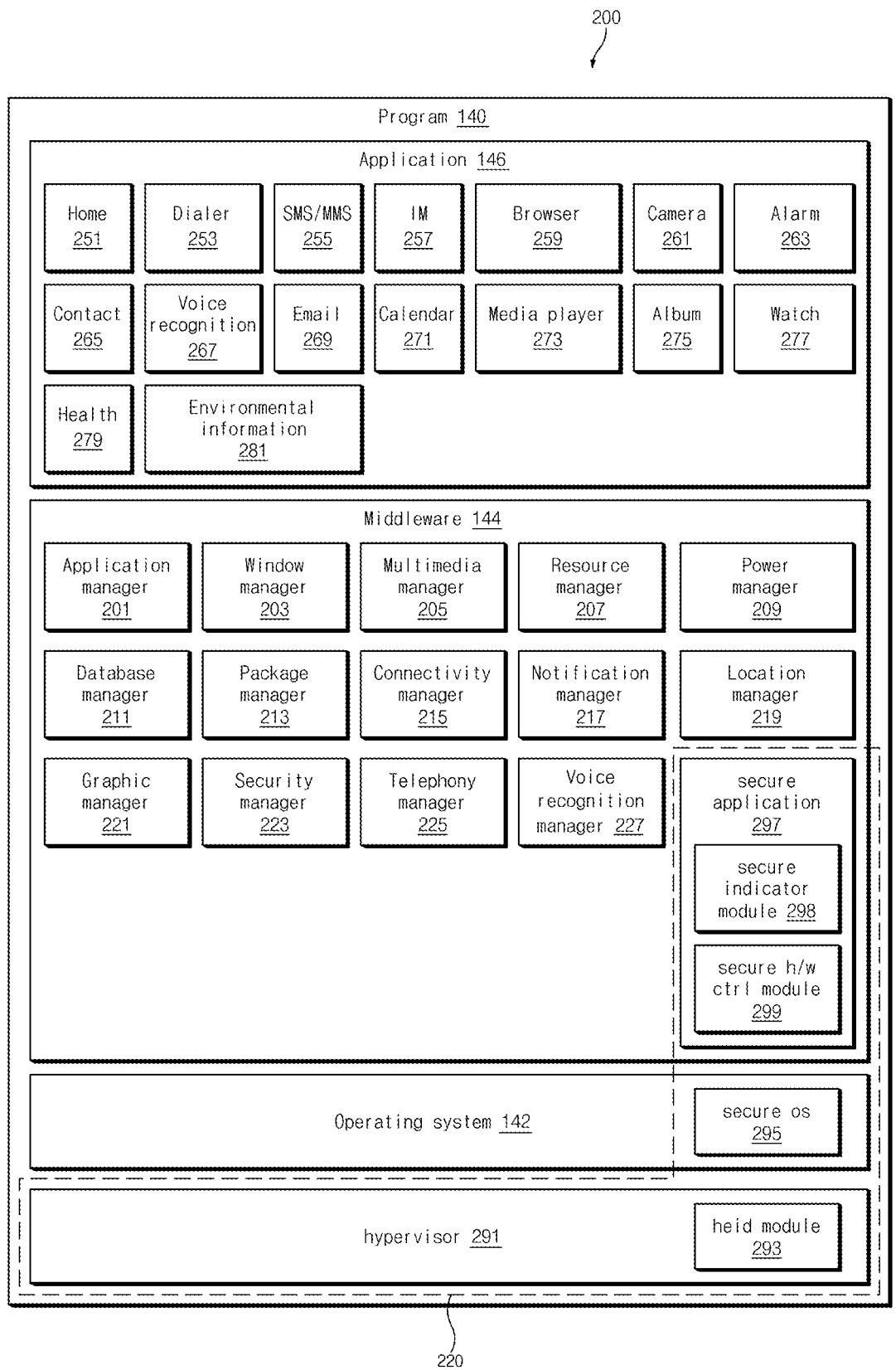
FIG. 2 is a block diagram illustrating a program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

According to various embodiments, the above-mentioned program 140 may include an additional configuration 220 for detecting an operation of at least one device (e.g., an audio module 170 comprising audio circuitry or a camera module 180 comprising camera circuitry) included in an electronic device (e.g., an electronic device 101 of FIG. 1) and notifying a user of the electronic device that the at least one device is operating. Each "module" herein preferably comprises circuitry. The additional configuration 220 may include a hypervisor 291, a secure OS 295, and/or a secure application 297.

According to an embodiment, the hypervisor 291 may be an area inaccessible by the OS 142 and the application 146. According to an embodiment, the hypervisor 291 may include a hypervisor-based external input detector (HEID) module 293 including detection circuitry. According to an embodiment, the HEID module 293 may detect an operation of at least one device included in the electronic device. According to an embodiment, the at least one device may be a hardware device. For example, in the electronic device using a memory-mapped I/O scheme, the HEID module 293 may detect access to an area (e.g., a hardware register area) of a memory (e.g., a volatile memory 132 of FIG. 1), to which at least one device of is mapped. According to an embodiment, the mapped area may refer to a storage space for an I/O of a hardware device. For example, the HEID module 293 may trap a read or write command delivered to the mapped area. For example, the HEID module 293 may change an exception level before an ARM core (e.g., a processor 120 of FIG. 1, including processing circuitry) executes the read or write command and may determine to execute or ignore a command in the hypervisor 291. The HEID module 293 may detect that the read or write command is delivered to the mapped area, for example, that a device corresponding to the mapped area is operating.

According to an embodiment, the secure OS 295 may be an OS for security purposes, which is provided to perform a function associated with the secure application 297. For example, the secure OS 295 may be an OS included in a secure world. According to an embodiment, the secure world may be one of areas into which a central processing unit (CPU) (e.g., the processor 120 of FIG. 1) is divided in hardware to provide a secure execution environment in the electronic device supporting an ARM architecture, and the other of the divided areas may be referred to as a normal world. All processing units herein include processing circuitry. For another example, the secure OS 295 may be an OS which is included in the normal world, but is separated from the OS 142 by the hypervisor 291, which may be an OS responsible for a security function. According to an embodiment, the hypervisor 291 may generate and manage a plurality of virtual machines which execute different OSs. For example, the OS 142 may be an OS executed by a first virtual machine, and the secure OS 295 may be an OS executed by a second virtual machine. The hypervisor 291 may be differently referred to as a virtual machine monitor or a virtual machine manager.

According to an embodiment, the secure OS 295 may deliver a detection signal for an operation of at least one device, which is delivered from the hypervisor 291 or the HEID module 293, to the secure application 297. According to an embodiment, the secure application 297 may include a secure indicator module 298 comprising circuitry and a secure hardware control module or a secure H/W ctrl module 299 comprising circuitry. For example, the secure indicator module 298 may receive the detection signal for the operation of the at least one device, which is delivered from the hypervisor 291. For example, the secure H/W ctrl module 299 may control a secure hardware device and may notify a user that the at least one device is operating.

According to an embodiment, the secure hardware device may include a device controllable in the secure world or the secure virtual machine (VM), for example, a display (e.g., a display module 160 of FIG. 1 comprising display circuitry, a vibrator (e.g., a haptic module 179 of FIG. 1), a light emitting diode (LED), or a wearable device (e.g., an electronic device 102 or an electronic device 104 of FIG. 1)). According to an embodiment, the secure VM may refer to a virtual machine which performs a secure function among sub VMs, each of which has an execution environment separated from a main VM by the hypervisor 291. For example, the secure application 297 may be run on the secure VM.

Hereinafter, a description will be given of a structure of the processor (e.g., the processor 120 of FIG. 1) according to various embodiments and an area where the program (e.g., the program 140 of FIGS. 1 and 2) is run by the processor with reference to FIGS. 3A and 3B.

Figure 3A:
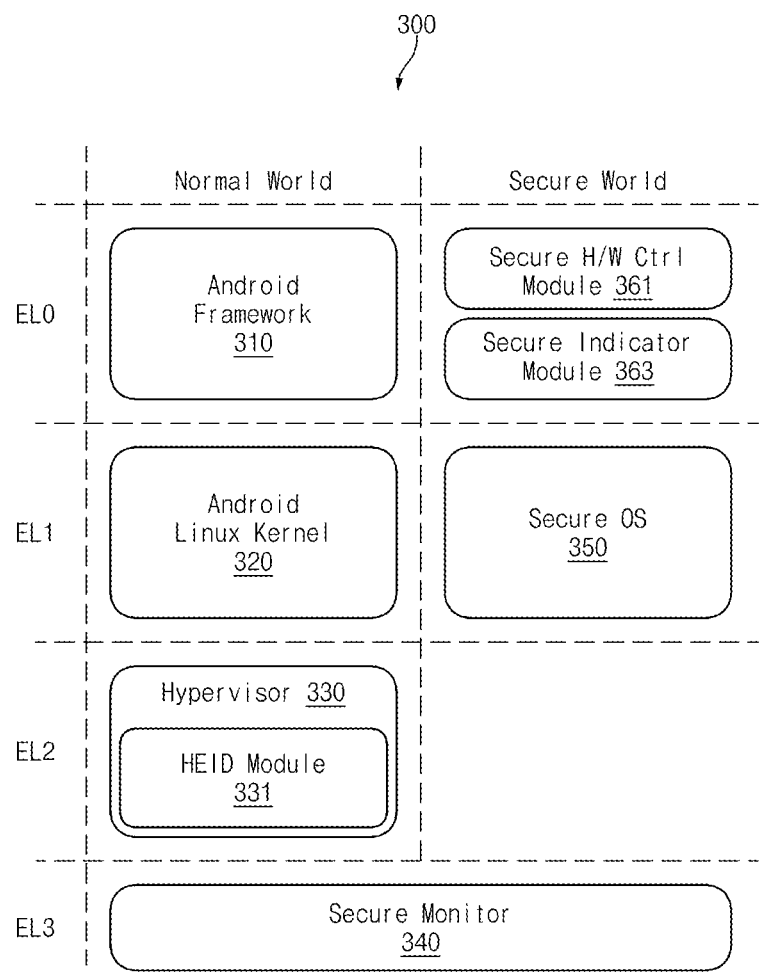
FIG. 3A is a drawing illustrating a structure of a processor according to an embodiment.

FIG. 3A is a drawing 300 illustrating a structure of a processor, including processing circuitry, according to an example embodiment. A processor described below may be a processor 120, including processing circuitry, of an electronic device 101 of FIG. 1.

Referring to FIG. 3A, the processor may operate in a plurality of exception levels (ELs). According to an example embodiment, a CPU (e.g., the processor 120) may be divided into a normal world and a secure world in hardware to provide a secure execution environment in an electronic device (e.g., an electronic device 101 of FIG. 1) supporting an ARM architecture. The normal world may be an execution environment where a normal OS or kernel operates, and the secure world may be an execution environment where a reliable trustzone operates. The CPU, for example, may not directly access a memory area where the secure world is executed in the normal world. According to an example embodiment, the processor may be divided into areas in hardware to differentiate executable permissions. The divided area may be defined as an EL. According to an embodiment, the normal world may be divided into EL0, EL1, EL2, and EL3, and the secure world may be divided into SEL0 (hereinafter, EL0 of the secure world is referred to as SEL0) and SEL1 (hereinafter, EL1 of the secure world is referred to as SEL1). The execution permission is higher in an order of EL3, EL2, EL1, and EL0 and is higher in an order of SEL1 and SEL0.

According to an example embodiment, EL0 may be a level where the processor runs a user application. For example, the processor, including processing circuitry, may run an Android framework 310 in EL0. According to an example embodiment, the Android framework 310 may include a framework for an operation of at least one first device (e.g., a camera (e.g., a camera module 180 of FIG. 1) or a microphone (e.g., an input module 150 of FIG. 1)) included in the electronic device. EL0 is, for example, an area with high security risk. When the security of the EL0 area is breached, a device may be used illegally irrespective of an intention of a user of the electronic device.

According to an example embodiment, EL1 may be a level where the processor runs an operations system (OS). For example, the processor may run an Android Linux kernel 320 in EL1. According to an example embodiment, the Android Linux kernel 320 may include an OS for an operation of the at least one first device (e.g., the camera or the microphone, comprising circuitry) included in the electronic device and a device driver for driving each device. EL1 is an area with high security risk. When the security of the EL1 area is breached, the device may be used illegally irrespective of the intention of the user of the electronic device.

According to an example embodiment, EL2 may be a level where the processor runs a hypervisor 330 (e.g., a hypervisor 291 of FIG. 2). EL2 may be an execution area which is included in the normal world, but may be relatively securely managed. According to an embodiment, the hypervisor 330 may include an HEID module 331 (e.g., an HEID module 293 of FIG. 2). According to an embodiment, the HEID module 331 may detect an operation of the at least one first device included in the electronic device.

According to an example embodiment, EL3 may be a level where the processor executes a secure monitor 340. According to an example embodiment, the secure monitor 340 may assist in switching between the normal world and the secure world.

According to an example embodiment, SEL0 may be an EL0 level of the secure world. According to an example embodiment, SEL0 may be a level where the processor runs secure firmware. For example, the processor may run a trusted app in SEL0. According to an example embodiment, a secure H/W ctrl module 361 (e.g., a secure H/W ctrl module 299 of FIG. 2) and a secure indicator module 363 (e.g., a secure indicator module 298) may be implemented in the form of the trusted app. For example, the processor, including processing circuitry, may run the secure indicator module 363 (a secure indicator trusted app) and the secure H/W ctrl module 361 (a secure H/W ctrl trusted app) in SEL0. According to an example embodiment, the secure indicator module 363 may receive the detection signal for the operation of the at least one first device, which is delivered from the HEID module 331. According to an example embodiment, the secure H/W ctrl module 361 may control at least one specified second device to provide a user with a notification that the at least one first device is operating. Herein, unlike the at least one first device which is an operation detection target, the at least one specified second device may be a device which is an electronic device (including circuitry) for providing a notification that the at least one first device is operating, which may be a device (e.g., a display, a vibrator, or an LED) included in the electronic device or a device (e.g., a wearable device) of an external electronic device (e.g., an electronic device 102 or an electronic device 104 of FIG. 1) which communicates with the electronic device. According to an example embodiment, the at least one first device may be selected as the operation detection target through a user interface. According to an example embodiment, the at least one specified second device may be specified for each of the at least one first device through the user interface.

According to an example embodiment, SEL1 may be an EL1 level of the secure world. According to an example embodiment, SEL1 may be a level where the processor runs a trusted OS. For example, the processor may run a secure OS 350 in SEL1. According to an example embodiment, the secure OS 350 may be an OS of the secure world for performing a function associated with the secure application (e.g., the secure indicator trusted app and the secure H/W ctrl trusted app) run in SEL0. According to an example embodiment, the secure OS 350 (e.g., a secure OS 295 of FIG. 2) may deliver the detection signal for the operation of the at least one first device, which is delivered from the HEID module 331, to the secure indicator module 363.

According to an example embodiment, there may be no EL2 in the secure world.

In an example embodiment shown in FIG. 3A, because the HEID module 331 is located in the normal world and the secure indicator module 363 and the secure H/W ctrl module 361 are located in the secure world and because direct access from the normal world to the secure world is impossible, the HEID module 331 may deliver the detection signal for the operation of the at least one first device to the secure indicator module 363 through the secure monitor 340 and the secure OS 350. The secure H/W ctrl module 361 may provide a notification that the at least one first device is operating using the at least one specified second device.

Figure 3B:
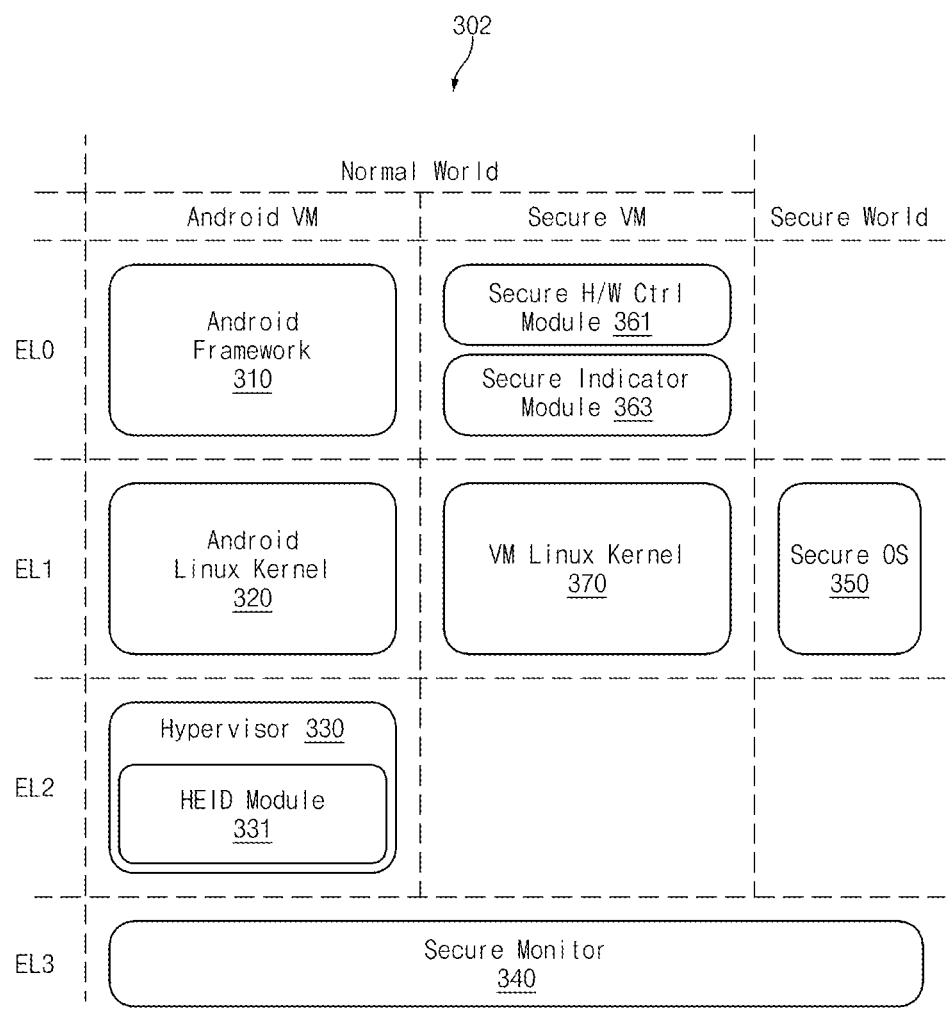
FIG. 3B is a drawing illustrating a structure of a processor according to an embodiment.

FIG. 3B is a drawing 302 illustrating a structure of a processor 120 according to an example embodiment. The contents described above with reference to FIG. 3A are also applicable to a description of a normal world, a secure world, EL0, EL1, EL2, EL3, SEL0, and SEL1 shown in FIG. 3B. Hereinafter, a description of FIG. 3B will be given of a structure different form a structure in FIG. 3A.

According to an example embodiment, a hypervisor 330 may manage at least one virtual machine. According to an embodiment, the at least one virtual machine may include a main virtual machine and one or more sub virtual machines. For example, the main virtual machine may be an Android VM, and the sub virtual machine may be a secure VM. Hereinafter, a description will be given of the case where the main virtual machine runs the Android OS, but not limited thereto. The main virtual machine may be a virtual machine which runs various OSs (e.g., iOS). The Android VM and the secure VM may provide execution environments which are separated from each other by the hypervisor 330. According to an embodiment, the at least one virtual machine may run different OSs. For example, the Android VM may run an Android Linux kernel 320, and the secure VM may run a VM Linux kernel 370. The VM Linux kernel 370 may be a second OS which is executable by being isolated from the Android Linux kernel 320 which is a main OS (or a first OS). According to an embodiment, the VM Linux kernel 370 may provide an environment where a function associated with the secure indicator module 363 and the secure H/W ctrl module 361 is able to be executed in a state where it is isolated from the Android Linux kernel 320 which is the main OS.

According to an embodiment, the processor may execute the VM Linux kernel 370, the secure indicator module 363, and/or the secure H/W ctrl module 361 on the secure VM. According to an embodiment, the processor may execute the VM Linux kernel 370 in EL1 and may execute the secure indicator module 363 and the secure H/W ctrl module 361 on EL0. According to an embodiment, although the Android VM and the secure VM are in the same exception level, they may be separated from each other in execution environment and permission. For example, although security of an EL0 area and an EL1 area on the Android VM is breached (e.g., hacked) irrespective of an intention of a user of the electronic device by an attacker, security of an EL0 area and an EL1 area on the secure VM may be maintained. For example, the attacker may fail to access the EL0 area and the EL1 area on the secure VM.

For example, when the attacker attacks the EL0 area and the EL1 area on the Android VM such that the at least one device operates, the HEID module 331 executed in an EL2 area may detect an operation of the at least one first device. In the EL2 area or an area where the hypervisor 330 is executed, the HEID module 331 may deliver a detection signal for an operation of the at least one first device to the secure indicator module 363 located in the EL0 area on the secure VM. The secure indicator module 363 may receive the detection signal from the HEID module 331. The secure H/W ctrl module 361 may control at least one specified second device in response to receiving the detection signal to provide a notification that the at least one first device is operating.

Referring to FIGS. 3A and 3B, for example, when the attacker attacks the EL0 area and the EL1 area on the Android VM such that the at least one first device operates, in the EL0 area and the EL1 area, the operation of the HEID module 331 executed in the EL2 area to which a permission higher than EL0 and EL1 is assigned may fail to be detected and the operations of the secure indicator module 363 and the secure H/W ctrl module 361 executed on the secure VM or in the secure world may fail to be detected. According to various embodiments disclosed in the disclosure, the processor may notify the user that the at least one first device is operating through a secure world based on the exception level structure having different permissions, the secure VM separated from the Android VM, and the secure world separated from the normal world and may cause the attacker to be unaware that the user was notified.

Hereinafter, an operation of an electronic device according to an embodiment will be described with reference to FIG. 4.

Figure 4:
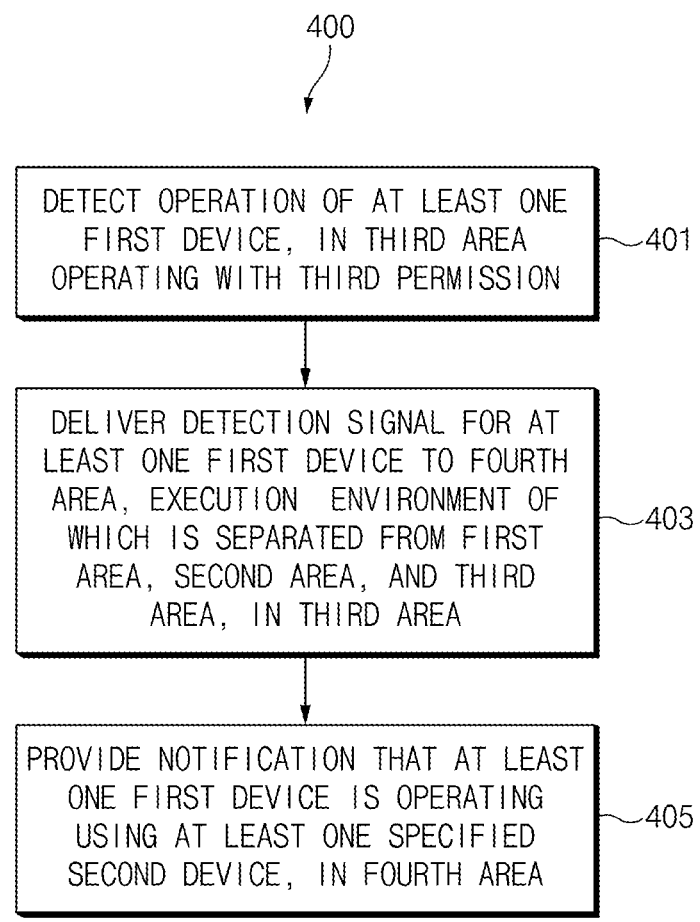
FIG. 4 is a flowchart illustrating an operation of an electronic device according to various embodiments.

FIG. 4 is a flowchart 400 illustrating an operation of an electronic device according to an embodiment. Operations of the electronic device, which will be described below, may be performed by an electronic device 101 of FIG. 1 or a processor 120 of the electronic device 101.

According to an embodiment, the electronic device may run a user application in a first area operating with a first permission and may run an operating system in a second area operating with a second permission higher than the first permission. Hereinafter, a third permission may be higher than the second permission. For example, the first area may be an EL0 area, the second area may be an EL1 area, and the third area may be an EL2 area.

In operation 401, the electronic device may detect an operation of at least one first device comprising circuitry, in the third area operating with the third permission. According to an embodiment, the electronic device may detect an operation of the at least one first device included in the electronic device, in the third area operating with the third permission higher than the second permission. For example, the first device may be a hardware device mounted on the electronic device, which may include a camera (e.g., a camera module 180 of FIG. 1) or a microphone (e.g., an input module 150 of FIG. 1). According to an embodiment, when a user or an attacker executes the at least one first device, a read or write command may be delivered to an area of a memory (e.g., a volatile memory 132 of FIG. 1) of the electronic device, to which the at least one first device is mapped. The electronic device may execute the read or write command delivered to the area of the memory, to which the at least one first device is mapped, in the third area. According to an embodiment, the electronic device may trap the read or write command to the third area. According to an embodiment, the electronic device may detect an operation of the at least one first device in the third area by trapping the read or write command to the third area. According to an embodiment, a hypervisor (e.g., a hypervisor 330 of FIGS.

3A and 3B) may be executed in the third area. For example, as the trap occurs, the electronic device may call an HEID module (e.g., an HEID module 331 of FIGS. 3A and 3B) in an area (an EL2 area) where the hypervisor is executed.

In operation 403, in the third area, the electronic device may deliver a detection signal for the at least one first device to a fourth area, an execution environment of which is separated from the first area, the second area, and the third area. According to an embodiment, the first area, the second area, and the third area may be included in a normal world, and the fourth area may be included in a secure world. For example, the first area may be an EL0 area of the normal world, the second area may be an EL1 area of the normal world, the third area may be an EL2 area of the normal world, and the fourth area may be an SEL0 area (an EL0 area of the secure world). According to an embodiment, the electronic device may deliver the detection signal to the fourth area through a fifth area operating with a permission higher than third permission in the third area. For example, the fifth area may be an EL3 area. According to an embodiment, the fifth area may be an area where a secure monitor (e.g., a secure monitor 340 of FIGS. 3A and 3B) is executed. According to an embodiment, the electronic device may deliver a detection signal for an operation of the at least one first device from the third area included in the normal world to the fourth area included in the secure world through the secure monitor. For example, the HEID module in the EL2 area may deliver the detection signal to a secure indicator module (e.g., a secure indicator module 363 of FIG. 3A) in the SEL0 area through the secure monitor in the EL3 area and a secure OS (e.g., a secure OS 350 of FIGS. 3A and 3B) in the SEL1 area.

According to an embodiment, the first area, the second area, the third area, and the fourth area may be included in the normal world, and the fourth area may be an area, an execution environment of which is separated from the first area and the second area by the hypervisor executed in the third area. According to an embodiment, the first area and the second area may be areas on a first virtual machine (e.g., an Android VM of FIG. 3B), and the fourth area may be an area on a second virtual machine (e.g., a secure VM of FIG. 3B) separated from the first virtual machine. For example, the first area may be the EL0 area on the first virtual machine, the second area may be the EL1 area on the first virtual machine, the third area may be the EL2 area on the first virtual machine, and the fourth area may be the EL0 area on the second virtual machine. According to an embodiment, the hypervisor executed in the third area may manage the first virtual machine and the second virtual machine. According to an embodiment, the electronic device may deliver the detection signal for the at least one first device from the third area where the hypervisor is executed to the fourth area which is an area on the second virtual machine. For example, the HEID module in the EL2 area may deliver the detection signal to a secure indicator module (e.g., a secure indicator module 363 of FIG. 3B) in the EL0 area on the second virtual machine through the EL1 area on the second virtual machine, which is separated from the EL0 area and the EL1 area on the first virtual machine. For another example, the HEID module in the EL2 area may deliver the detection signal to the secure indicator module (e.g., the secure indicator module 363 of FIG. 3B) in the EL0 area on the second virtual machine through the secure monitor in the EL3 area and the EL1 area on the second virtual machine.

In operation 405, the electronic device may provide a notification that the at least one first device is operating using at least one specified second device. According to an embodiment, the fourth area may be included in the secure world. For example, the fourth area may be the SEL0 area (the EL0 area of the secure world). For example, the electronic device may execute a secure H/W ctrl module (e.g., a secure H/W ctrl module 361 of FIG. 3A) in the SEL0 area. According to an embodiment, the secure H/W ctrl module may control the at least one specified second device comprising circuitry. According to an embodiment, the at least one specified second device may be selected as a device of a notification of whether a device is operating for each of the at least one first device through a user interface. For example, the at least one specified second device may include at least one of a display, a vibrator, an LED, or a wearable device. According to an embodiment, the secure H/W ctrl module may control the at least one specified second device to provide a notification that the at least one first device is operating. For example, the electronic device may display a message or an icon providing the notification that the at least one first device is operating on the display. For another example, the electronic device may allow the vibrator to generate vibration or may allow the LED to emit light, thus providing the notification that the at least one first device is operating. For another example, the electronic device may transmit a signal or data providing the notification that the at least one first device is operating to a wearable device which communicates with the electronic device. The wearable device may provide the notification that the at least one first device is operating using, for example, a display, a vibrator, or an LED of the wearable device.

According to an embodiment, the fourth area may be an area on the secure VM. For example, the fourth area may be the EL0 area on the secure VM. For example, the electronic device may execute a secure H/W ctrl module (e.g., a secure H/W ctrl module 361 of FIG. 3B) in the EL0 area on the secure VM. According to an embodiment, the secure H/W ctrl module may control the at least one specified second device to provide the notification that the at least one first device is operating. The description in the above-mentioned embodiment is also applicable to the secure H/W ctrl module and the at least one specified second device.

Hereinafter, a description will be given of an operating method where the electronic device according to an embodiment detects the operation of the at least one first device with reference to FIG. 5.

Figure 5:
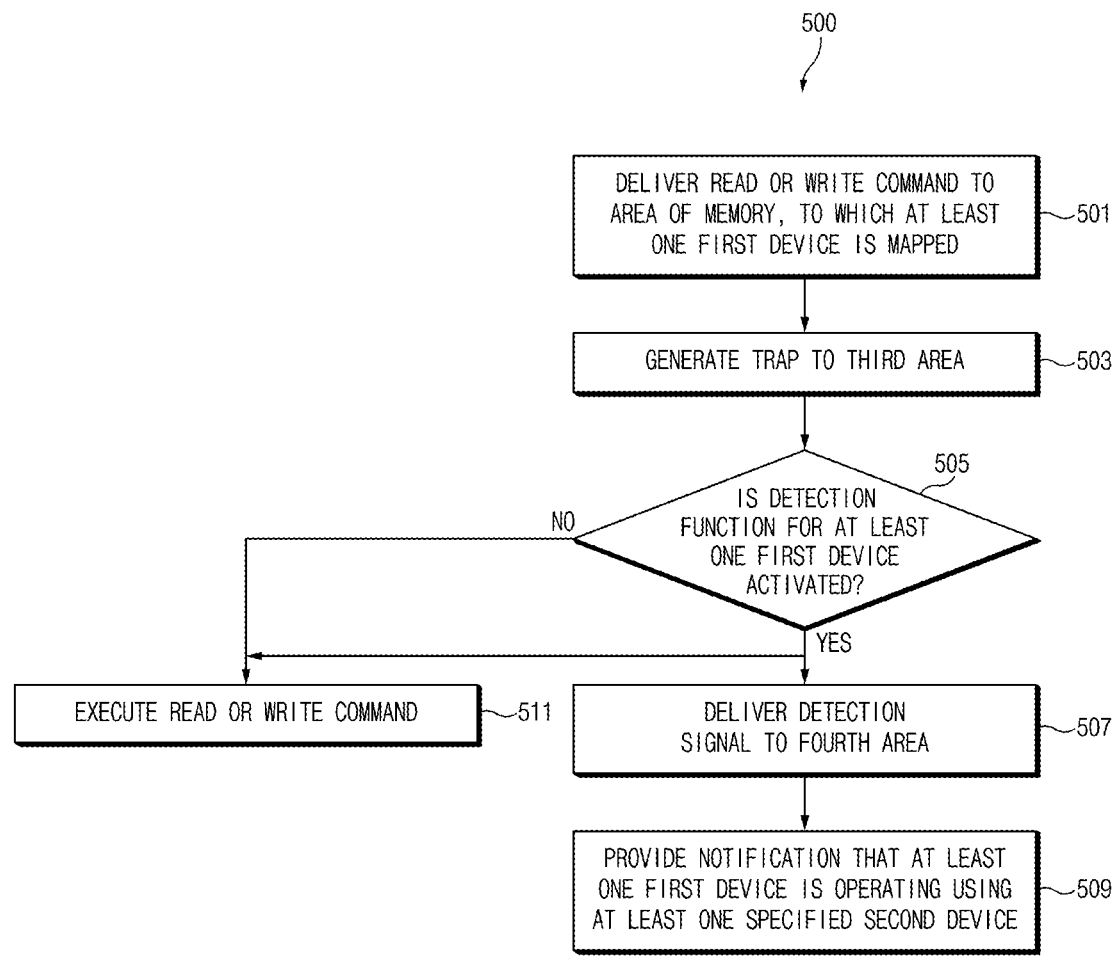
FIG. 5 is a flowchart illustrating an operation of an electronic device according to various embodiments.

FIG. 5 is a flowchart 500 illustrating an operation of an electronic device according to an embodiment. Operations of the electronic device, which will be described below, may be performed by an electronic device 101 of FIG. 1 or a processor 120 of the electronic device 101. The operations of the electronic device, which will be described below, may be performed in at least one area shown in FIG. 3A or 3B.

In operation 501, the electronic device may deliver a read or write command to an area of a memory, to which the at least one first device is mapped. According to an embodiment, a memory (e.g., a volatile memory 132 of FIG. 1) of the electronic device may include an area to which the at least one first device is mapped. For example, the area of the memory of the electronic device, to which the at least one first device is mapped, may be a register associated with an I/O of the at least one first device. For example, the electronic device may run an application associated with the at least one first device by an attacker. As executing the application associated with the at least one first device, the electronic device may deliver the read or write command to the area of the memory, to which the at least one first device is mapped. According to an example embodiment, that the electronic device delivers the read or write command to the area of the memory, to which the at least one first device is mapped, may mean that the electronic device accesses the register associated with the I/O of the at least one first device to operates the at least one first device. According to an embodiment, operation 501 of the electronic device may be performed in a first area (e.g., an EL0 area of a normal world of FIG. 3A or an EL0 area on an Android VM of FIG. 3B) and a second area (e.g., an EL1 area of the normal world of FIG. 3A or an EL1 area on the Android VM of FIG. 3B).

In operation 503, the electronic device may generate a trap to a third area (e.g., an EL2 area of the normal world of FIG. 3A or an EL2 area on the Android VM of FIG. 3B). According to an embodiment, the electronic device may generate the trap to the third area based on the read or write command delivered to the area of the memory, to which the at least one first device is mapped. According to an embodiment, the electronic device may generate the trap to the third area to detect an operation of the at least one first device in the third area. According to an embodiment, the third area may be an area where a hypervisor (e.g., a hypervisor 330 of FIG. 3A or 3B) is executed. According to an embodiment, the trap to the third area may include calling, by the electronic device, the hypervisor executed in the third area. For example, the area of the memory, to which the at least one first device is mapped, may be set to a state where it is impossible to be read or written. As the read or write command is delivered to the area of the memory, to which the at least one first device is mapped, in such a set state, a permission fault may occur. The electronic device may generate exception in an HEID module (e.g., an HEID module 331 of FIG. 3A or 3B) of the hypervisor to detect an operation of the at least one first device in the third area where the hypervisor is executed. According to an embodiment, operation 503 of the electronic device may be performed in the third area.

In operation 505, the electronic device may determine (or identify) whether a detection function for the at least one first device is activated. According to an embodiment, the electronic device may determine whether to a function of detecting an operation of the at least one first device is activated. For example, the electronic device may determine whether a function of the HEID module is activated with respect to the at least one first device. When the detection function for the at least one first device is activated, the electronic device may perform operation 507 and operation 511. When the detection function for the at least one first device is deactivated, the electronic device may perform operation 511 without performing operation 507. According to an embodiment, operation 505 of the electronic device may be performed in the third area.

In operation 507, the electronic device may deliver the detection signal to a fourth area (e.g., an EL0 area (an SEL0 area) of a secure world of FIG. 3A or an EL0 area on a secure VM of FIG. 3B). According to an embodiment, the electronic device may deliver the detection signal for the operation of the at least one first device from the third area to the fourth area. According to an embodiment, the detection signal for the operation of the at least one first device may indicate that the at least one first device is operating. For example, when the electronic device is implemented in a structure shown in FIG. 3A, it may deliver the detection signal for the at least one first device to the fourth area (e.g., the EL0 area (the SEL0 area) of the secure world) through a fifth area (e.g., an EL3 area of the normal world or an area where a secure monitor is executed) with a permission higher than the third area (e.g., the EL2 area of the normal world or an area where the hypervisor is executed) in the third area. The electronic device may deliver the detection signal for the operation of the at least one first device to the fourth area through the fifth area and a sixth area (e.g., an EL1 area (an SEL1 area) of the secure world) with a permission higher than the fourth area. For another example, when the electronic device is implemented in a structure shown in FIG. 3B, it may deliver the detection signal for the at least one first device to the fourth area (e.g., the EL0 area on the secure VM) in the third area (e.g., the EL2 area on the Android VM or the area where the hypervisor is executed). The electronic device may deliver the detection signal for the operation of the at least one first device to the fourth area through a seventh area (e.g., the EL area on the secure VM) with a permission higher than the fourth area in the third area. According to various embodiments, the detection signal for the operation of the at least one first device may be delivered to a secure indicator module (e.g., a secure indicator module 363 of FIG. 3A or 3B) in the fourth area.

In operation 509, the electronic device may provide a notification that the at least one first device is operating using at least one specified second device. According to an embodiment, the electronic device may determine the at least one specified second device through a user interface for selecting a device which is a device which provides a notification that the device is operating with respect to each of the at least one first device. According to an embodiment, the at least one specified second device may be a device (e.g., a display, a vibrator, or an LED) included in the electronic device or an external electronic device (e.g., a wearable device) which communicate with the electronic device. According to an embodiment, the electronic device may perform operation 509 in the fourth area. According to an embodiment, the electronic device may execute a secure H/W ctrl module (e.g., a secure H/W ctrl module 361 of FIG. 3A or 3B) which performs hardware control for each of the at least one specified second device in the fourth area. According to an embodiment, the secure H/W ctrl module may control at least one control module corresponding to the at least one specified second device. For example, when the at least one specified second device includes a display and/or a vibrator, the secure H/W ctrl module may include a module which controls the display and/or a module which controls the vibrator. For example, the electronic device may display a message or an icon for providing a notification that the at least one first device is operating on the display and may generate vibration for providing the notification that the at least one first device is operating using the vibrator.

In operation 511, the electronic device may execute the read or write command. According to an embodiment, the electronic device may execute the read or write command in the third area. For example, the area of the memory, to which the at least one first device is mapped, may be set to a state where it is impossible to be read or written in the first area or the second area. As the read or write command is delivered to the area of the memory, to which the at least one first device is mapped, in such a set state, the electronic device may generate a trap to the third area where the hypervisor is executed. After the trap, the electronic device may execute the read or write command for the at least one first device in the third area rather than the first area or the second area. According to an embodiment, that the electronic device executes the read or write command for the at least one first device may be that the electronic device allows the at least one first device to operate. According to an embodiment, executing the read or write command in the above-mentioned third area rather than the first area or the second area may be performed by the hypervisor in the third area or the HEID module of the hypervisor. According to an embodiment, the electronic device may operate the at least one first device irrespective of providing the notification that the at least one first device is operating using the at least one specified second device.

Hereinafter, a description will be given of an operating method where the electronic device detects the operation of the at least one first device and provides the notification that the at least one first device is operating with reference to FIG. 6.

Figure 6:
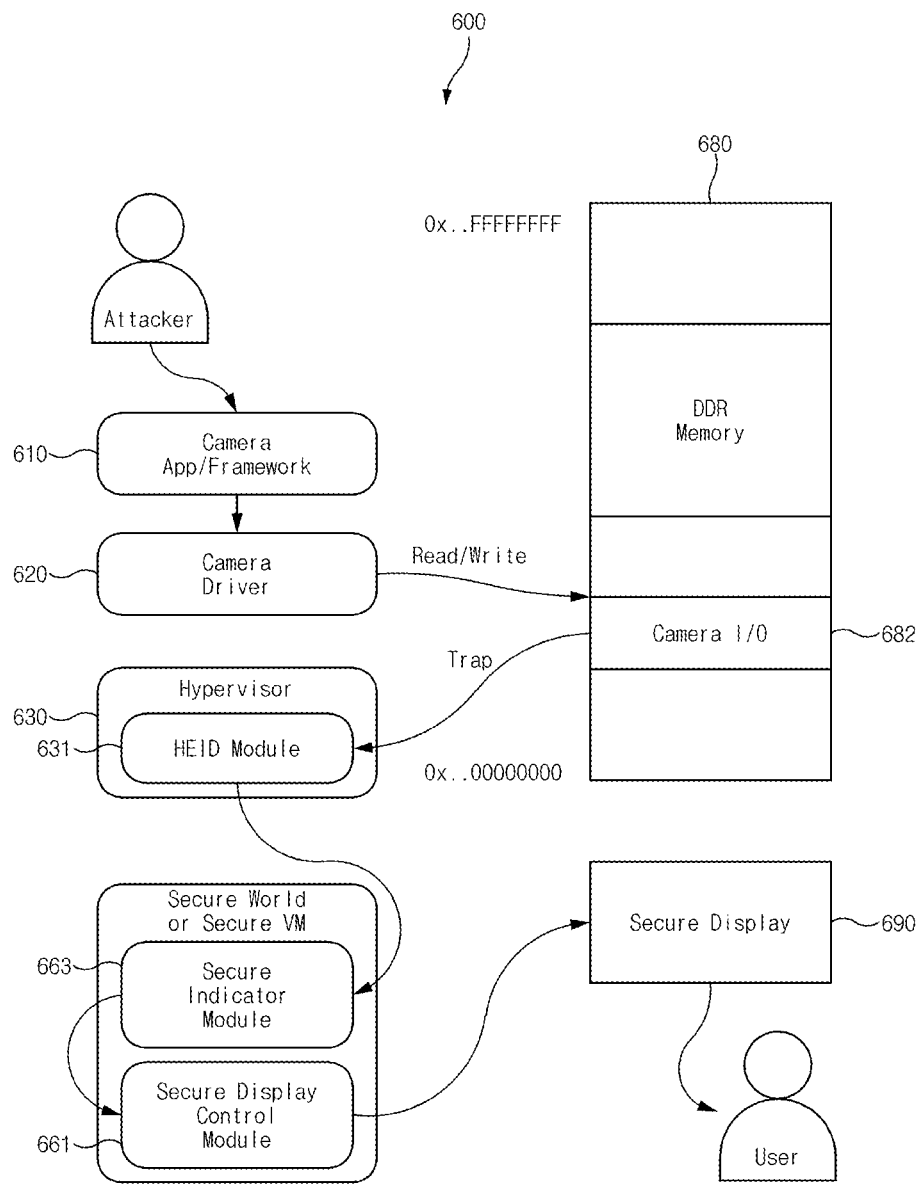
FIG. 6 is a drawing for describing an operation of an electronic device according to various embodiments.

FIG. 6 is a drawing 600 for describing an operation of an electronic device according to an embodiment. Operations of the electronic device, which will be described below, may be performed by an electronic device 101 of FIG. 1 or a processor 120 of the electronic device 101. Operations of a software module (e.g., a camera app/framework 610) (e.g., an Android framework 310 of FIG. 3A or 3B), a camera driver 620 (e.g., an Android Linux kernel 320 of FIG. 3A or 3B), a hypervisor 630 (e.g., a hypervisor 330 of FIG. 3A or 3B), an HEID module 631 (e.g., an HEID module 331 of FIG. 3A or 3B), a secure indicator module 663 (e.g., a secure indicator module 363 of FIG. 3A or 3B), or a secure display control module 661 (e.g., a secure H/W ctrl module 361 of FIG. 3A or 3B) may be performed by the electronic device 101 of FIG. 1 or the processor 120 of the electronic device 101.

Referring to FIG. 6, the electronic device may execute the camera app/framework 610 (or the camera framework). For example, the electronic device may execute the camera app/framework 610 based on control of an attacker. Herein, the attacker may not be a user of the electronic device and may be a person who wants to control the electronic device irrespective of an intention of the user. For example, the attacker may direct control the electronic device or may indirectly control the electronic device by way of an external electronic device. According to an embodiment, the electronic device may run the camera app/framework 610 in a first area (e.g., an EL0 area of a normal world of FIG. 3A or an EL0 area on an Android VM of FIG. 3B). As the camera app/framework 610 is run, the electronic device may execute the camera driver 620 for driving at least one first device (e.g., a camera). According to an embodiment, the electronic device may execute the camera driver 620 in a second area (e.g., an EL1 area of the normal world of FIG. 3A or an EL1 area on the Android VM of FIG. 3B). The camera driver 620 may access a register (e.g., a camera I/O) 682 associated with an I/O of the camera such that the camera operates. For example, the camera driver 620 may deliver a read or write command to the register 682 associated with the I/O of the camera such that the camera operates. According to an embodiment, the electronic device may access the register 682 associated with the I/O of the camera based on an address of a system physical address space 680 allocated to the register 682 associated with the I/O of the camera. According to an embodiment, the register 682 associated with the I/O of the camera may correspond to an area of the system physical address space 680, to which the camera is mapped.

According to an embodiment, as the read or write command is delivered from the camera driver 620 to the register 682 associated with the I/O of the camera, the electronic device may generate a trap to a third area (e.g., an EL2 area of the normal world of FIG. 3A or an EL2 area on the Android VM of FIG. 3B). For example, the register 682 associated with the I/O of the camera may be set to be impossible to be read or written by the camera driver 620. In this case, the trap to the third area may be a permission fault. According to an embodiment, the third area may be an area where the hypervisor 630 is executed. According to an embodiment, the hypervisor 630 may include the HEID module 631. According to an embodiment, as the trap to the third area is generated, the HEID module 631 may detect an operation of the camera.

According to an embodiment, the HEID module 631 may deliver a detection signal for the operation of the camera to the secure indicator module 663. According to an embodiment, the detection signal for the operation of the camera may include a signal indicating that the camera is operating (or in use). According to an embodiment, the secure indicator module 663 may deliver the detection signal for the operation of the camera to a module (e.g., the secure display control module 661) for controlling a device (e.g., a secure display 690) which is a device which provides a notification that the camera is operating. According to an embodiment, the electronic device may execute the secure indicator module 663 and the secure display control module 661 in a fourth area. For example, the fourth area may be an EL0 area (an SEL0 area) of the secure world of FIG. 3A. The HEID module 631 may deliver the detection signal for the operation of the camera to the fourth area through a fifth area (e.g., an EL3 area of FIG. 3A or an area where a secure monitor 340 is executed), which has a permission higher than the third area, and a sixth area (e.g., an EL1 area (an SEL1 area) of the secure world), which has a permission higher than the fourth area. For another example, the fourth area may be an EL0 area on a secure VM of FIG. 3B. The HEID module 631 may deliver the detection signal for the operation of the camera to the fourth area through a seventh area (e.g., an EL1 area on the secure VM), which has a permission higher than the fourth area.

According to an embodiment, the secure display control module 661 may notify a user that the camera is operating using the secure display 690. For example, the secure display control module 661 may display a message for providing a notification that the camera is operating on the secure display 690. For another example, the secure display control module 661 may display an icon for providing the notification that the camera is operating on the secure display 690 or may display different icons (e.g., icons with different colors or shapes) when the camera is not operating and when the camera is operating.

In the above-mentioned embodiment, the case where only the secure display 690 is designated as the device which is the device which provides the notification that the camera is operating, but not limited thereto. The electronic device may notify a device which is a device which provides a notification that a device is operating with respect to each of at least one first device (e.g., a camera) which is an operation detection target that the at least one first device is operating using at least one specified second device. The at least one specified second device may include, for example, a display, a vibrator, an LED, or a wearable device which communicates with the electronic device.

Hereinafter, a description will be given of an operating method where the electronic device according to various embodiments provides the notification that the at least one first device is operating using the secure display with reference to FIGS. 7A and 7B.

Figure 7A:
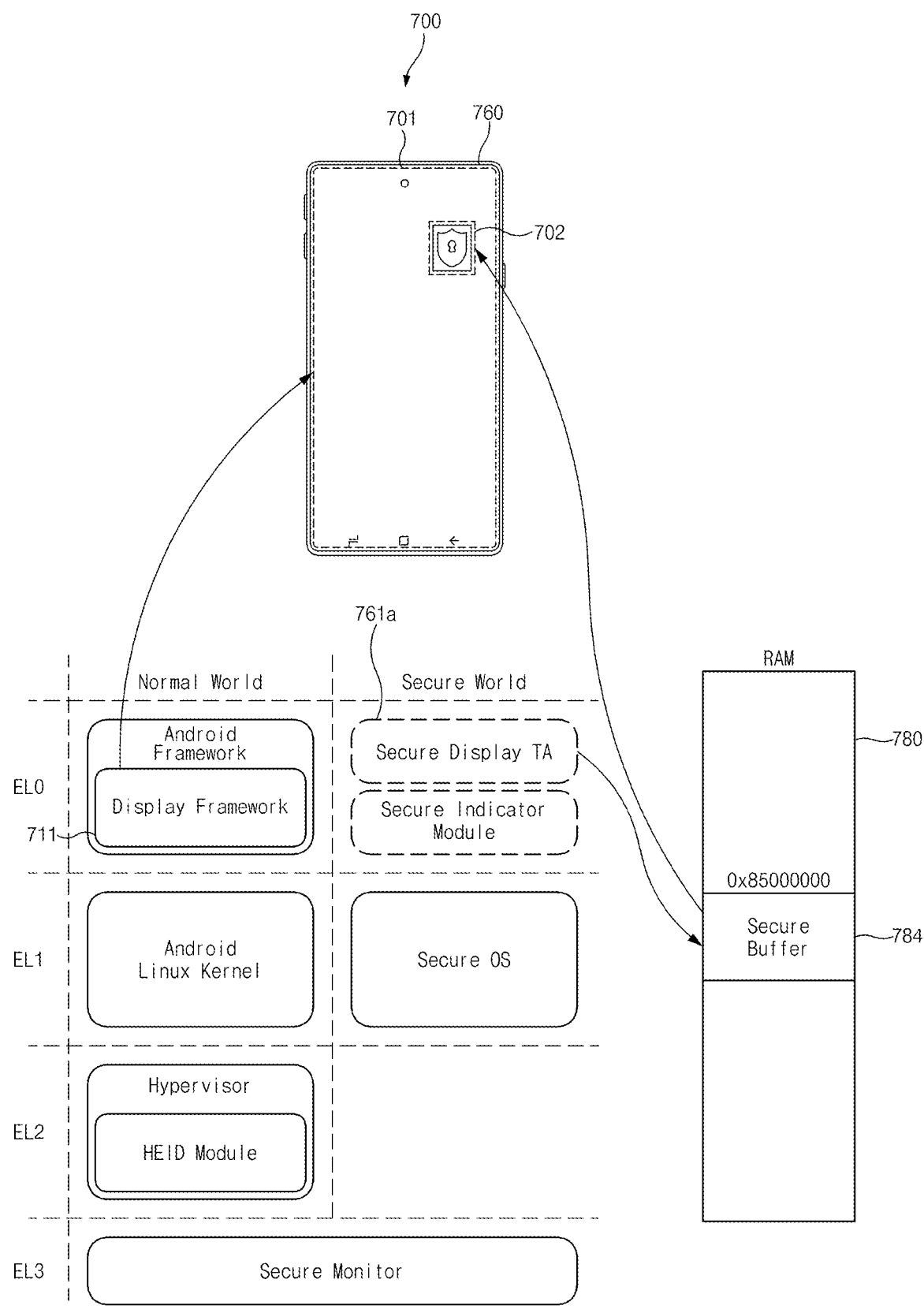
FIG. 7A is a drawing for describing an operation of an electronic device according to an embodiment.

FIG. 7A is a drawing 700 for describing an operation of an electronic device according to an embodiment. Operations of the electronic device, which will be described below, may be performed by an electronic device 101 of FIG. 1 or a processor 120 of the electronic device 101.

Referring to FIG. 7A, a processor of the electronic device may have a structure of a processor shown in FIG. 3A. The processor of the electronic device may run a program (e.g., a program 140 of FIGS. 1 and 2) in each area shown in FIG. 3A. According to an embodiment, an execution environment and a permission of the processor may be divided into a normal world and a secure world by an ARM exception level architecture.

According to an embodiment, the electronic device may execute an HEID module (e.g., an HEID module 331 of FIG. 3A) in an EL2 area of the normal world (an area where a hypervisor (e.g., a hypervisor 330 of FIG. 3A) is executed). The HEID module may detect an operation of the at least one first device (e.g., a camera or a microphone) included in the electronic device. According to an embodiment, the electronic device may execute a secure indicator module (e.g., a secure indicator module 363 of FIG. 3A) and a secure display trusted app (TA) 761a (e.g., a secure H/W ctrl module 361 of FIG. 3A) in an EL0 area (an SEL0 area) of a secure world. The secure indicator module may receive a detection signal for an operation of the at least one first device, which is delivered from the HEID module. The secure display TA 761a may control at least one specified second device (e.g., a display 760 (e.g., a display module 160 of FIG. 1)) to notify a user that the at least one first device is operating.

According to an embodiment, the electronic device may execute a display framework 711 (e.g., an Android framework 310 of FIG. 3A) in an EL0 area of a normal world. According to an embodiment, the display framework 711 may display a screen on a first area 701 of the display 760 of the electronic device. According to an embodiment, the electronic device may execute the secure display TA 761a in an EL0 area (an SEL0 area) of a secure world. According to an embodiment, the secure display TA 761a may display a notification screen on a second area 702 of the display 760 of the electronic device. According to an embodiment, the secure display TA 761a may display a notification screen on the second area 702 which is unable to be falsified in the normal world using a secure buffer 784. According to an embodiment, the second area 702 of the display 760 of the electronic device, which is unable to be falsified in the normal world, may be referred to as a secure display (e.g., a secure display 690 of FIG. 6). For example, the secure buffer 784 may be at least a portion of a memory 780 (e.g., a random access memory (RAM) (e.g., a volatile memory 132 of FIG. 1)) of the electronic device. The notification screen may include at least one of, for example, a message or an icon indicating that the at least one first device (e.g., the camera or the microphone) included in the electronic device is operating.

Figure 7B:
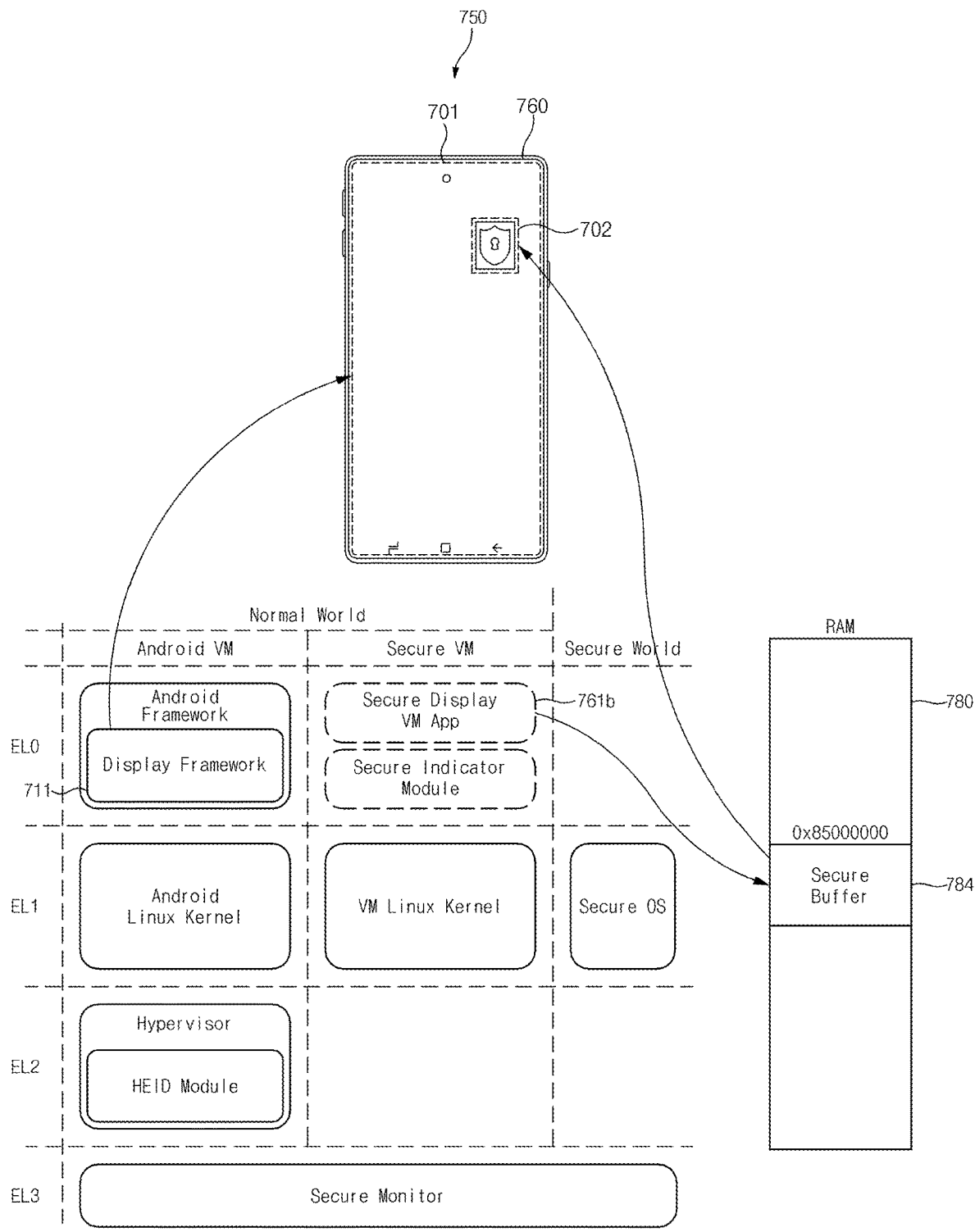
FIG. 7B is a drawing for describing an operation of an electronic device according to an embodiment.

FIG. 7B is a drawing 750 for describing an operation of an electronic device according to an embodiment. Operations of the electronic device, which will be described below, may be performed by an electronic device 101 of FIG. 1 or a processor 120 of the electronic device 101.

Referring to FIG. 7B, a processor of the electronic device may have a structure of a processor shown in FIG. 3B. The processor of the electronic device may run a program (e.g., a program 140 of FIGS. 1 and 2) in each area shown in FIG. 3B. According to an embodiment, an execution environment and a permission of the processor may be divided into an Android VM and a secure VM by a hypervisor (e.g., a hypervisor 330 of FIG. 3B).

According to an embodiment, the electronic device may execute an HEID module (e.g., an HEID module 331 of FIG. 3B) in an EL2 area on the Android VM (an area where the hypervisor is executed). The HEID module may detect an operation of at least one first device (e.g., a camera or a microphone) included in the electronic device. According to an embodiment, the electronic device may execute a secure indicator module (e.g., a secure indicator module 363 of FIG. 3B) and a secure display VM app 761b (e.g., a secure H/W ctrl module 361 of FIG. 3B) in an EL0 area on the secure VM. The secure indicator module may receive a detection signal for an operation of the at least one first device, which is delivered from the HEID module. The secure display VM app 761b may control at least one specified second device (e.g., a display 760 (e.g., a display module 160 of FIG. 1)) to notify a user that the at least one first device is operating.

According to an embodiment, the electronic device may execute a display framework 711 (e.g., an Android framework 310 of FIG. 3B) in an EL0 area on the Android VM. According to an embodiment, the display framework 711 may display a screen on a first area 701 of the display 760 of the electronic device. According to an embodiment, the electronic device may execute the secure display VM app 761b in an EL0 area on the secure VM. According to an embodiment, the secure display VM app 761b may display a notification screen on a second area 702 of the display 760 of the electronic device. According to an embodiment, the secure display VM app 761b may display a notification screen on the second area 702 which is unable to be falsified in the Android VM using a secure buffer 784. According to an embodiment, the second area 702 of the display 760 of the electronic device, which is unable to be falsified in the Android VM, may be referred to as a secure display (e.g., a secure display 690 of FIG. 6). For example, the secure buffer 784 may be at least a portion of a memory 780 (e.g., a random access memory (RAM) (e.g., a volatile memory 132 of FIG. 1)) of the electronic device. The notification screen may include at least one of, for example, a message or an icon indicating that the at least one first device (e.g., the camera or the microphone) included in the electronic device is operating.

Hereinafter, a description will be given of an example of a screen where the electronic device provides the notification that the at least one first device is operating using the display with reference to FIG. 8.

Figure 8:
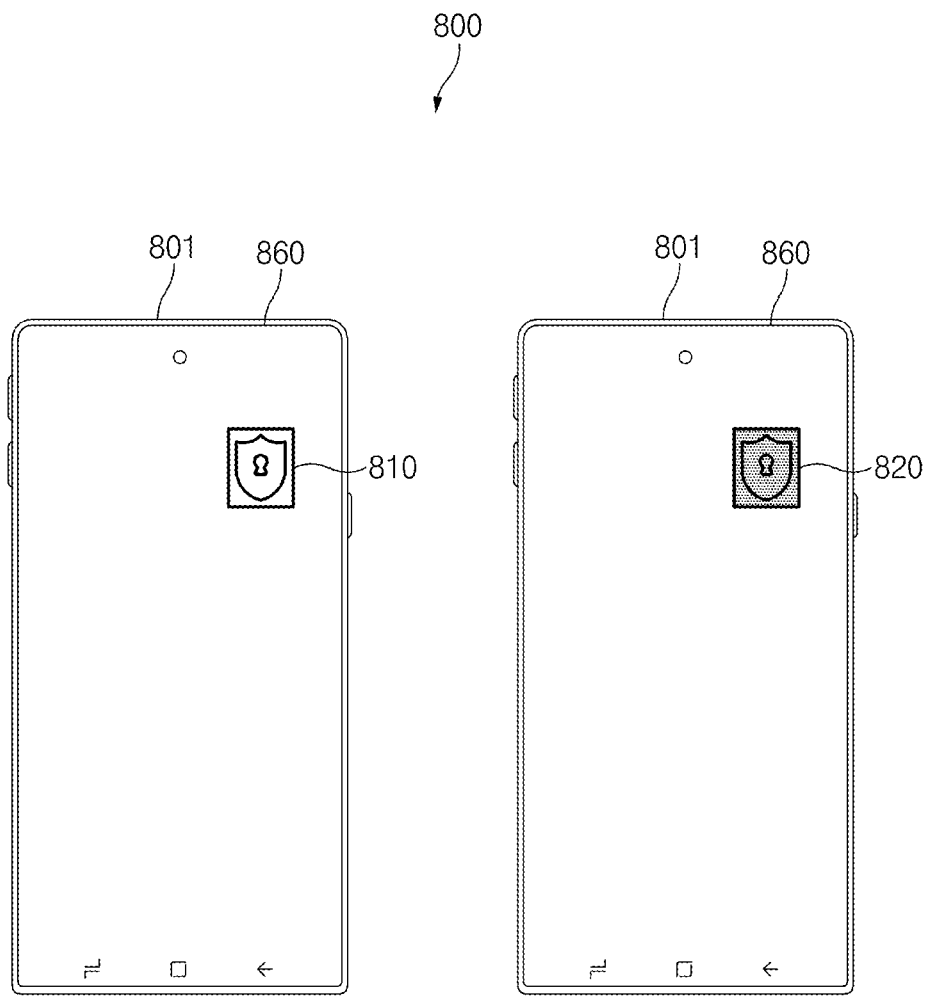
FIG. 8 is a drawing illustrating an example of a notification screen displayed on a display by an electronic device according to various embodiments.

FIG. 8 is a drawing 800 illustrating an example of a notification screen displayed on a display by an electronic device according to an embodiment. Operations of an electronic device 801, which will be described below, may be performed by an electronic device 101 of FIG. 1 or a processor 120 of the electronic device 101.

According to an embodiment, the electronic device 801 may detect an operation of at least one first device (e.g., a camera or a microphone) to provide a notification that the at least one first device is operating using a display 860. According to various embodiments, the electronic device may display a notification screen including a first icon 810 or a second icon 820 on a secure display (e.g., a second area 702 of FIG. 7A or 7B) of an electronic device described with reference to FIG. 7A or 7B.

Referring to FIG. 8, for example, before detecting an operation of the at least one first device, the electronic device 801 may display the first icon 810 indicating that the at least one first device is not operating on the display 860. As detecting the operation of the at least one first device, the electronic device 801 may display the second icon 820 indicating that the at least one first device is operating on the display 860. According to an embodiment, the first icon 810 and the second icon 820 may be different types of images or may be different in transparency, color, or image from each other although they are the same type of image.

Hereinafter, a description will be given of an example of implementing a secure H/W ctrl module (e.g., a secure H/W ctrl module 361 of FIG. 3A or 3B) of the electronic device according to an embodiment, when the electronic device provides the notification that the at least one first device is operating using the at least one specified second device.

Figure 9:
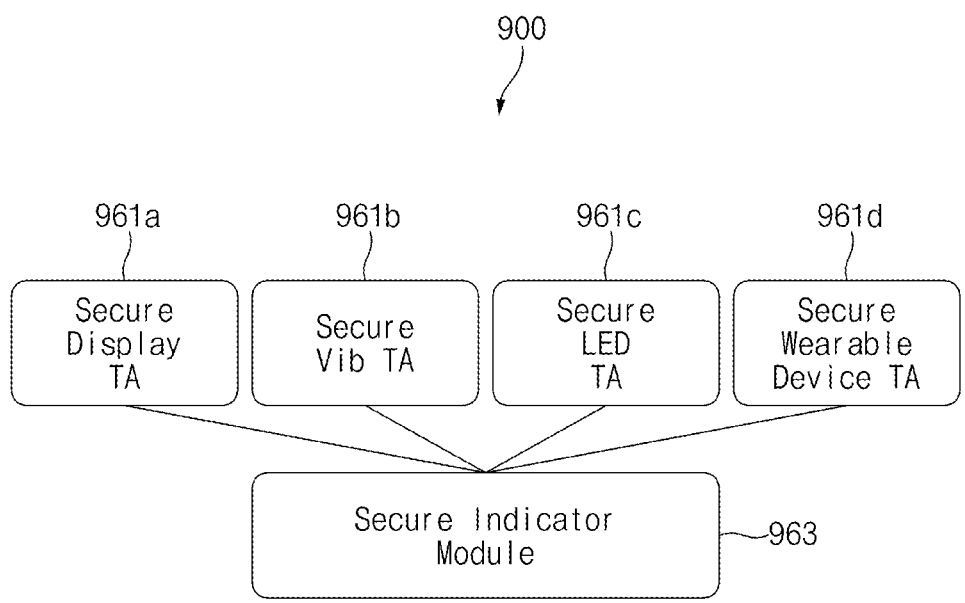
FIG. 9 is a drawing illustrating an example of implementing a secure H/W ctrl module of an electronic device according to various embodiments.

FIG. 9 is a drawing 900 illustrating an example of implementing a secure H/W ctrl module of an electronic device according to an embodiment. Operations of the electronic device, which will be described below, may be performed by an electronic device 101 of FIG. 1 or a processor 120 of the electronic device 101.

FIG. 9 illustrates a secure indicator module (e.g., a secure indicator module 363 of FIG. 3A) and a secure H/W ctrl module (e.g., a secure H/W ctrl module 361 of FIG. 3A) executed in an EL0 area (an SEL0 area) of a secure world. According to an embodiment, the secure H/W ctrl module may include a module which controls each of at least one second device which is specified as a device for providing a notification that at least one first device is operating.

According to an embodiment, the electronic device may determine the at least one second device which is specified as a device which is the device for providing the notification that the at least one first device is operating. According to an embodiment, the at least one specified second device may be a hardware device of the electronic device controlled in a secure world, an execution environment of which is separated from a normal world, or a hardware device of an external electronic device which communicates with the electronic device. For example, the at least one specified second device may include a display, a vibrator, an LED, and/or a wearable device.

Referring to FIG. 9, the electronic device may execute a secure display TA 961*a*, a secure vibrator trusted app (e.g., Vib TA) 961*b*, a secure LED TA 961*c*, and/or a secure wearable device TA 961*d* in an EL0 area (an SEL0 area) of the secure world. The electronic device may execute a secure indicator module 963 in the EL0 area (the SEL0 area) of the secure world. The secure indicator module 963 may receive a detection signal for an operation of the at least one first device from an HEID module (e.g., an HEID module 331 of FIG. 3A) executed in an EL2 area of a normal world. Referring to FIG. 9, The secure indicator module 963 may transmit the detection signal for the operation of the at least one first device, which is received from the HEID module, to the secure display TA 961*a*, the secure Vib TA 961*b*, the secure LED TA 961*c*, and/or the secure wearable device TA 961*d*. According to an embodiment, the secure display TA 961*a*, the secure Vib TA 961*b*, the secure LED TA 961*c*, and/or the secure wearable device TA 961*d* may provide the notification that the at least one first device is operating using second device(s) (e.g., a display, a vibrator, an LED, or a wearable device) respectively corresponding thereto. For example, the secure display TA 961*a* may display a message or an icon for providing the notification that the at least one first device is operating on the display. For example, the secure Vib TA 961*b* may generate vibration using the vibrator to provide the notification that the at least one first device is operating. For example, the secure LED TA 961*c* may turn on the LED to provide the notification that the at least one first device is operating. For another example, the secure wearable device TA 961*d* may emit light to the wearable device which communicates with the electronic device to transmit a signal or data for providing the notification that the at least one first device is operating. The wearable device may provide the notification that the at least one first device is operating using, for example, a display, a vibrator, or an LED of the wearable device.

The description is given of the secure indicator module (e.g., the secure indicator module 363 of FIG. 3A) and the secure H/W ctrl module (e.g., the secure H/W ctrl module 361 of FIG. 3A) executed in the EL0 area (an SEL0 area) of the secure world, but not limited thereto. The above-mentioned contents are also applicable to a secure indicator module (e.g., a secure indicator module 363 of FIG. 3B) and a secure H/W ctrl module (e.g., a secure H/W ctrl module 361 of FIG. 3B) executed in an EL0 area on a secure VM of FIG. 3B. For example, when a plurality of second devices are specified as devices which are devices for providing the notification that the at least one first device is operating, the electronic device may execute a control module for each of the plurality of specified second devices, in the EL0 area on the secure VM. The plurality of control modules may control the corresponding devices, respectively, to provide the notification that the at least one first device is operating.

Hereinafter, a description will be given of a user interface provided to select a device which is a target of a notification of whether the device is operating and a device which is a device of a notification of whether the device is operating by the electronic device according to an embodiment.

Figure 10:
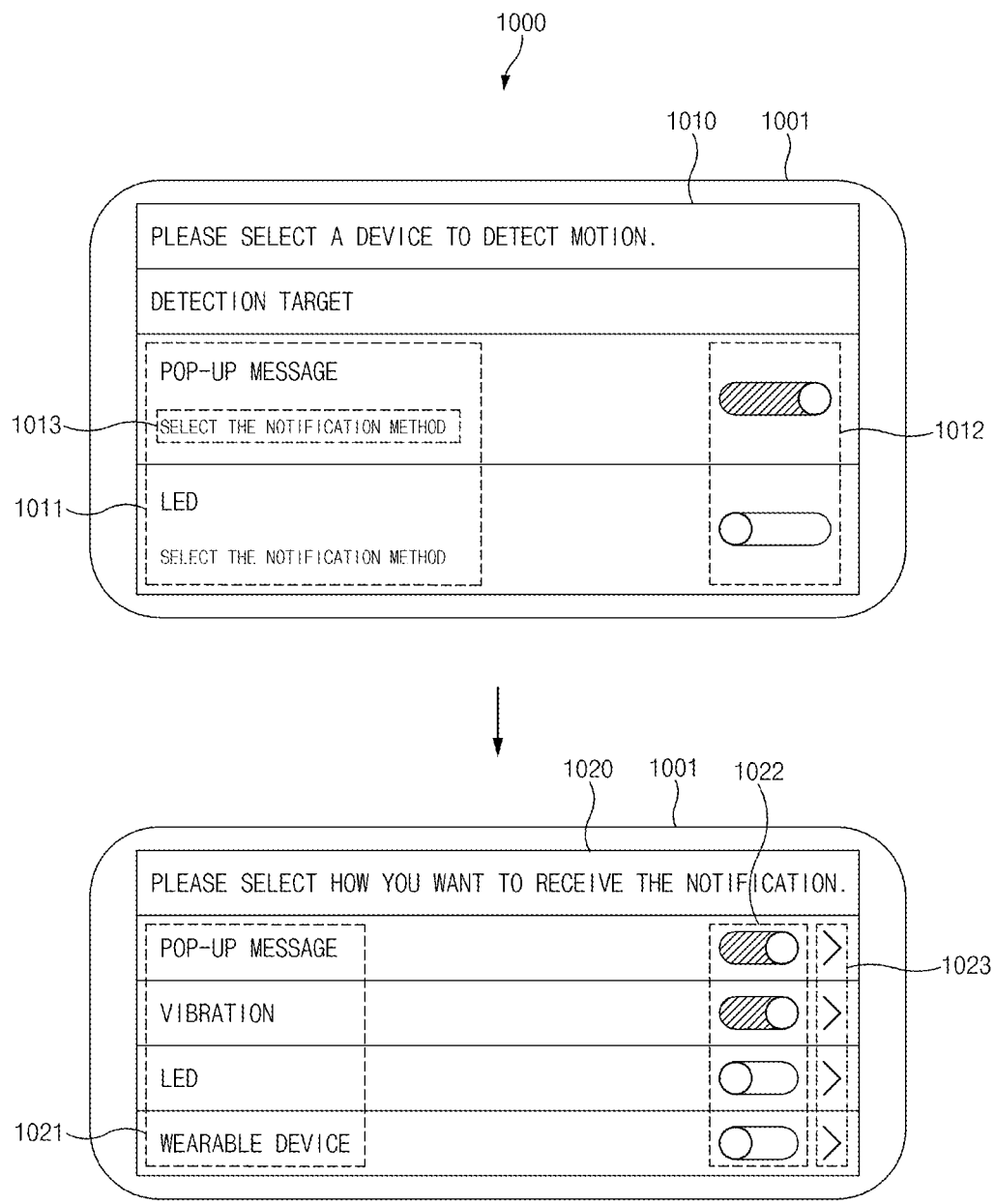
FIG. 10 is a drawing illustrating a user interface provided by an electronic device according to various embodiments.

FIG. 10 is a drawing 1000 illustrating an example user interface provided by an electronic device according to an embodiment. Operations of an electronic device 1001, which will be described below, may be performed by an electronic device 101 of FIG. 1 or a processor 120 of the electronic device 101.

Referring to FIG. 10, the electronic device 1001 may display a first user interface 1010 to select at least one first device which is a target of a notification of whether the device is operating on a display (e.g., a display module 160 of FIG. 1) of the electronic device 1001. According to an embodiment, the first user interface 1010 may include a list 1011 (one or more items) of the at least one first device. According to an embodiment, the at least one first device may be at least one hardware device included in the electronic device 1001. According to an embodiment, the first user interface 1010 may include a button user interface (UI) capable of setting whether to detect an operation of each of the at least one first device included in the list 1011.

According to an embodiment, when it is set to detect the operation of the at least one first device included in the list 1011, the first user interface 1010 may include an element (e.g., a first element 1013) to display a user interface to select a notification method for operation detection. For example, as it is set to detect the operation with respect to a camera based on a user input to the button UI 1012, the electronic device 1001 may activate the first element 1013 to display a UI to select a notification method when detecting an operation of the camera. According to an embodiment, the electronic device 1001 may activate only an element corresponding to a device set to detect an operation among the at least one first device included in the list 1011. According to an embodiment, only when the element is activated, the electronic device 1001 may receive a user input to the element.

According to an embodiment, as receiving an input for selecting the first element 1013, the electronic device 1001 may display a second user interface 1020. According to an embodiment, the second user interface 1020 may be a user interface to select a notification method for whether a first device (e.g., a camera) selected on the first user interface 1010 is operating. According to an embodiment, the electronic device 1001 may provide a notification that the at least one first device is operating using at least one second device. According to an embodiment, the second user interface 1020 may include a list 1021 of at least one notification method. According to an embodiment, because the at least one notification method is able to correspond to the at least one second device, respectively, the list 1021 may be a list of the at least one second device. According to an embodiment, the at least one second device may be a hardware device capable of being securely controlled by the electronic device 1001 in a state where the security of the electronic device 1001 is breached. According to an embodiment, the at least one second device may be a hardware device of the electronic device 1001 or a hardware device capable of communicating with the electronic device 1001. Referring to FIG. 10, for example, the list 1021 may include a notification method using a pop-up message, a notification method using vibration, a notification method using an LED, and/or a notification method using a wearable device. For example, as receiving an input for selecting the notification method using the pop-up message, when detecting an operation of the at least one first device, the electronic device 1001 may display a pop-up message for providing a notification that the at least one first device is operating on a display (e.g., a display module 160 of FIG. 1). For example, as receiving an input for selecting the notification method using the vibration, when detecting an operation of the at least one first device, the electronic device 1001 may allow a vibrator (e.g., a haptic module 179 of FIG. 1) to generate vibration. For example, as receiving an input for selecting the notification method using the LED, when detecting an operation of the at least one first device, the electronic device 1001 may turn on the LED. For example, as receiving an input for selecting the notification method using the wearable device, when detecting an operation of the at least one first device, the electronic device 1001 may transmit a signal or data for providing the notification that the at least one first device is operating to the wearable device (e.g., an electronic device 102 or an electronic device 104 of FIG. 1) which communicates with the electronic device 1001.

According to an embodiment, the second user interface 1020 may include a button user interface (UI) capable of setting whether to use each of the at least one notification method included in the list 1021. According to an embodiment, the electronic device 1001 may determine the at least one second device, corresponding to the notification method set to be used through the button UI 1022, as a device which is a device for providing the notification that the at least one first device is operating. For example, as it is set to use the notification methods using the pop-up message and the vibration based on a user input to the button UI 1022, when detecting an operation of a camera, the electronic device 1001 may display a pop-up message for providing the notification that the camera is operating on the display and may control the vibrator to generate vibration.

According to an embodiment, the second user interface 1020 may include an element (e.g., a second element 1023) to display a user interface to set a notification method for each of the at least one notification method included in the list 1021. According to an embodiment, as receiving an input for selecting the second element 1023, the electronic device 1001 may display a detailed setting UI for the corresponding notification method. For example, a detailed setting UI for the notification method using the pop-up message may include a UI element for setting a message display location and/or size on the display. For example, a detailed setting UI for the notification method using the vibration may include a UI element for setting vibration intensity and/or interval. For example, a detailed setting UI for the notification method using the LED may include a UI element for setting an LED color and an LED ON/OFF period. For example, a detailed setting UI for the notification method using the wearable device may include a UI element for setting whether a message is output on the display of the wearable device or whether the vibrator of the wearable device vibrates.

Hereinafter, an operation of the electronic device according to an embodiment will be described with reference to FIG. 11.

Figure 11:
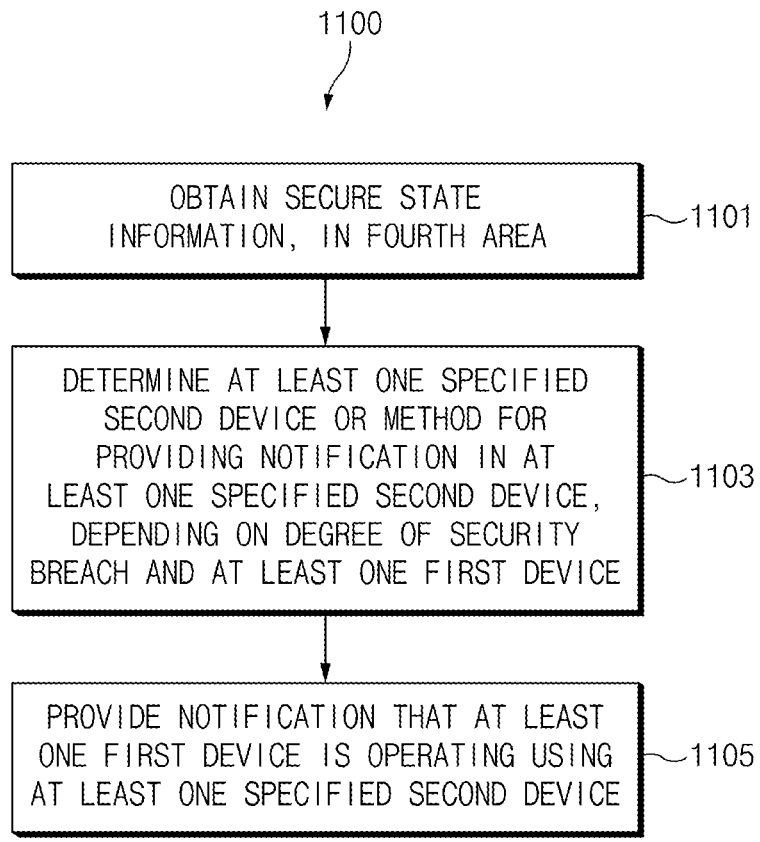
FIG. 11 is a flowchart illustrating an operation of an electronic device according to various embodiments.

FIG. 11 is a flowchart 1100 illustrating an operation of an electronic device according to an embodiment. Operations of the electronic device, which will be described below, may be performed by an electronic device 101 of FIG. 1 or a processor 120 of the electronic device 101.

In operation 1101, the electronic device may obtain secure state information, in a fourth area. According to an embodiment, the electronic device may obtain secure state information of the electronic device using an application which monitors a secure state of the electronic device, in the fourth area. For example, the fourth area may be an EL0 area (an SEL0 area) of a secure world of FIG. 3A. For another example, the fourth area may be an EL0 area on a secure VM of FIG. 3B. According to an embodiment, the electronic device may run an application which monitors a secure state of the electronic device in the fourth area. According to an embodiment, the application which monitors the secure state of the electronic device may obtain secure state information including the result of monitoring at least one secure index. According to an embodiment, the secure state information may indicate a degree of security breach. For example, the electronic device may determine whether security is breached for each of the at least one secure index based on the result of monitoring the at least one secure index. For example, the electronic device may determine whether the security is breached as, but not limited to, a "security breach state" or a "security maintenance state". The electronic device may determine a degree of security breach based on the number of indexes determined as the "security breach state".

In operation 1103, the electronic device may determine at least one specified second device or a method for providing a notification in the at least one specified second device, depending on the degree of security breach and at least one first device. According to an embodiment, the at least one first device may be a device which is a target, an operation of which is detected by the electronic device. According to an embodiment, the at least one specified second device may be a device specified as a device where the electronic device provides a notification that the at least one first device is operating. According to an embodiment, the electronic device may differently determine the at least one specified second device depending on whether the at least one first device which is an operation detection target is a certain device, although degrees of security breach are the same as each other, and may differently determine the at least one specified second device depending on the degree of security breach, although operation detection targets are the same as each other. According to an embodiment, the electronic device may differently determine at least one of the number of the at least one specified second device or a kind (or type) of the at least one specified second device depending on the degree of security breach. For example, the electronic device may determine to provide the notification that the at least one first device is operating using an LED as the degree of security breach has a first value, provide the notification that the at least one first device is operating using and the LED and a vibrator as the degree of security breach has a second value higher than the first value, and provide the notification that the at least one first device is operating using the LED, the vibrator, and a display as the degree of security breach has a third value higher than the second value. According to an embodiment, the electronic device may differently determine at least one of the number of the at least one specified second device or a kind (or type) of the at least one specified second device depending on the at least one first device. For example, the electronic device may provide a notification that a microphone is operating using the vibrator when detecting an operation of the microphone and may provide a notification that a camera is operating using the vibrator and the display when detecting an operation of the camera.

In operation 1103, the electronic device may differently determine the method for providing a notification in the at least one specified second device, depending on the degree of security breach and the at least one first device. For example, the electronic device may be configured to provide a notification that the microphone or the camera is operating using the vibrator with respect to the microphone and the camera. For example, the higher the degree of security breach, the shorter the electronic device may determine a vibration period to be. For example, the electronic device may determine such that vibration intensity when detecting the operation of the microphone is stronger than vibration intensity when detecting the operation of the camera.

In operation 1105, the electronic device may provide the notification that the at least one first device is operating using the at least one specified second device. According to an embodiment, the electronic device may detect an operation of the at least one first device. The electronic device may identify the at least one first device. The electronic device may determine a degree of security breach of the electronic device based on secure state information obtained when detecting the operation of the at least one first device. In operation 1103 described above, the electronic device may determine at least one specified second device and a notification method of the at least one specified second device depending on the at least one identified first device and the determined degree of security breach. In operation 1105, the electronic device may provide the notification that the at least one first device is operating depending on the at least one determined specified second device and the notification thereof.

According to an embodiment disclosed in the disclosure, an electronic device (e.g., an electronic device 101 of FIG. 1, an electronic device 801 of FIG. 8, or an electronic device 1001 of FIG. 10) may include a memory (e.g., a memory 130 of FIG. 1 or a memory 780 of FIG. 7A or 7B) and a processor (e.g., a processor 120 of FIG. 1) operatively connected with the memory. The processor may run a user application (e.g., an application 146 of FIGS. 1 and 2, an Android framework 310 of FIG. 3A or 3B, or a camera application 610 of FIG. 6) in a first area operating with a first permission, may run an operating system (e.g., an OS 142 of FIGS. 1 and 2, an Android Linux kernel 320 of FIG. 3A or 3B, or a camera driver 620 of FIG. 6) in a second area operating with a second permission higher than the first permission. The memory may store instructions, when executed, causing the processor to detect an operation of at least one first device (e.g., a camera module 180 or an input module 150 of FIG. 1) included in the electronic device, in a third area operating with a third permission higher than the second permission, deliver a detection signal for the at least one first device to a fourth area, an execution environment of which is separated from the first area, the second area, and the third area, in the third area, and provide a notification that the at least one first device is operating using at least one specified second device (e.g., a display module 160, a haptic module 179, or an electronic device 102 of FIG. 1, a secure display 690 of FIG. 6, a display 760 of FIGS. 7A and 7B, or a display 860 of FIG. 8), in the fourth area. The fourth area may be an area on a second virtual machine (e.g., a secure VM of FIG. 3B), an execution environment of which is separated from the first area and the second area being areas on a first virtual machine (e.g., an Android VM of FIG. 3B) by a hypervisor (e.g., a hypervisor 291 of FIG. 2, a hypervisor 330 of FIG. 3A or 3B, or a hypervisor 630 of FIG. 6) executed in the third area.

According to an embodiment disclosed in the disclosure, the electronic device may further include a display (e.g., a display module 160 of FIG. 1, a display 760 of FIGS. 7A and 7B, or a display 860 of FIG. 8). The instructions may cause the processor to display a first user interface to select the at least one first device being a target of a notification of whether a device is operating and a second user interface to select the at least one specified second device being a device of the notification of whether the device is operating with respect to each of the at least one first device on the display.

According to an embodiment disclosed in the disclosure, the memory may include an area to which the at least one first device is mapped (e.g., a register 682 associated with an I/O of a camera in FIG. 6). The instructions may cause the processor to execute a read or write command delivered to the mapped area, in the first area or the second area and generate a trap to the third area based on the read or write command to detect the operation of the at least one first device in the third area.

According to an embodiment disclosed in the disclosure, the instructions may cause the processor to obtain secure state information of the electronic device using an application monitoring a secure state of the electronic device, in the fourth area, and provide a notification that the at least one first device is operating based on the obtained secure state information and which device the at least one first device is.

According to an embodiment disclosed in the disclosure, the secure state information may indicate a degree of security breach. The instructions may cause the processor to determine the at least one specified second device depending on the degree of security breach and the at least one first device or may change a method for providing a notification in the at least one specified second device.

According to an embodiment disclosed in the disclosure, the instructions may cause the processor to determine whether to activate a detection function for the at least one first device, in the third area, deliver a detection signal for the at least one first device to the fourth area based on determining that the detection function of the at least one first device is activated, and prevent/reduce to deliver the detection signal for the at least one first device to the fourth area based on determining that the detection function of the at least one first device is not activated.

According to an embodiment disclosed in the disclosure, the first area may be an exception level (EL)0 area on the first virtual machine, the second area may be an EL1 area on the first virtual machine, the third area may be an EL2 area on the first virtual machine, and the fourth area may be an EL0 area on the second virtual machine.

According to an embodiment disclosed in the disclosure, an electronic device (e.g., an electronic device 101 of FIG. 1, an electronic device 801 of FIG. 8, or an electronic device 1001 of FIG. 10) may include a memory (e.g., a memory 130 of FIG. 1 or a memory 780 of FIG. 7A or 7B) and a processor (e.g., a processor 120 of FIG. 1) operatively connected with the memory. The processor may run a user application (e.g., an application 146 of FIGS. 1 and 2, an Android framework 310 of FIG. 3A or 3B, or a camera application 610 of FIG. 6) in a first area operating with a first permission, may run an operating system (e.g., an OS 142 of FIGS. 1 and 2, an Android Linux kernel 320 of FIG. 3A or 3B, or a camera driver 620 of FIG. 6) in a second area operating with a second permission higher than the first permission. The memory may store instructions, when executed, causing the processor to detect an operation of at least one first device (e.g., a camera module 180 or an input module 150 of FIG. 1) included in the electronic device, in a third area operating with a third permission higher than the second permission, deliver a detection signal for the at least one first device to a fourth area included in a secure world (e.g., a secure world of FIG. 3A), an execution environment of which is separated from a normal world (e.g., a normal world of FIG. 3A) including the first area, the second area, and the third area, in the third area, and provide a notification that the at least one device is operating using at least one specified second device (e.g., a display module 160, a haptic module 179, or an electronic device 102 of FIG. 1, a secure display 690 of FIG. 6, a display 760 of FIGS. 7A and 7B, or a display 860 of FIG. 8), in the fourth area.

According to an embodiment disclosed in the disclosure, the instructions may cause the processor to deliver the detection signal to the fourth area, through a fifth area operating with a permission higher than the third permission, in the third area. The fifth area may be an area where a secure monitor (e.g., a secure monitor 340 of FIG. 3A) assisting in switching between the normal world and the secure world is executed.

According to an embodiment disclosed in the disclosure, the first area may be an EL0 area of the normal world, the second area may be an EL1 area of the normal world, the third area may be an EL2 area of the normal world, the fourth area may be an EL0 area of the secure world, and the fifth area may be an EL3 area.

According to an embodiment disclosed in the disclosure, an operating method of an electronic device (e.g., an electronic device 101 of FIG. 1, an electronic device 801 of FIG. 8, or an electronic device 1001 of FIG. 10) may include running, by a processor (e.g., a processor 120 of FIG. 1) of the electronic device, a user application (e.g., an application 146 of FIGS. 1 and 2, an Android framework 310 of FIG. 3A or 3B, or a camera application 610 of FIG. 6) in a first area operating with a first permission, running, by the processor, an operating system (e.g., an OS 142 of FIGS. 1 and 2, an Android Linux kernel 320 of FIG. 3A or 3B, or a camera driver 620 of FIG. 6) in a second area operating with a second permission higher than the first permission, detecting, by the processor, an operation of at least one first device (e.g., a camera module 180 or an input module 150 of FIG. 1) included in the electronic device, in a third area operating with a third permission higher than the second permission, delivering, by the processor, a detection signal for the at least one first device to a fourth area, an execution environment of which is separated from the first area, the second area, and the third area, in the third area, and providing, by the processor, a notification that the at least one first device is operating using at least one specified second device (e.g., a display module 160, a haptic module 179, or an electronic device 102 of FIG. 1, a secure display 690 of FIG. 6, a display 760 of FIGS. 7A and 7B, a display 860 of FIG. 8), in the fourth area. The fourth area may be an area on a second virtual machine (e.g., a secure VM of FIG. 3B), an execution environment of which is separated from the first area and the second area being areas on a first virtual machine (e.g., an Android VM of FIG. 3B) by a hypervisor (e.g., a hypervisor 291 of FIG. 2, a hypervisor 330 of FIG. 3A or 3B, or a hypervisor 630 of FIG. 6) executed in the third area.

According to an embodiment disclosed in the disclosure, the processor may display a first user interface to select the at least one first device being a target of a notification of whether a device is operating and a second user interface to select the at least one specified second device being a device of the notification of whether the device is operating with respect to each of the at least one first device on a display (e.g., a display module 160 of FIG. 1, a display 760 of FIGS. 7A and 7B, or a display 860 of FIG. 8) of the electronic device.

According to an embodiment disclosed in the disclosure, the processor may execute a read or write command delivered to an area of a memory of the electronic device (e.g., a register 682 associated with an I/O of a camera of FIG. 6), the area to which the at least one first device is mapped, in the first area or the second area and may generate a trap to the third area based on the read or write command to detect the operation of the at least one first device in the third area.

According to an embodiment disclosed in the disclosure, the processor may obtain secure state information of the electronic device using an application monitoring a secure state of the electronic, in the fourth area, and may provide a notification that the at least one first device is operating based on the obtained secure state information and which device the at least one first device is.

According to an embodiment disclosed in the disclosure, the secure state information may indicate a degree of security breach. The processor may determine the at least one specified second device depending on the degree of security breach and the at least one first device or may change a method for providing a notification in the at least one specified second device.

According to an embodiment disclosed in the disclosure, the processor may determine whether to activate a detection function for the at least one first device, in the third area, may deliver a detection signal for the at least one first device to the fourth area as determining that the detection function of the at least one first device is activated, and prevent/reduce to deliver the detection signal for the at least one first device to the fourth area as determining that the detection function of the at least one first device is not activated.

According to an embodiment disclosed in the disclosure, the first area may be an exception level (EL)0 area on the first virtual machine, the second area may be an EL1 area on the first virtual machine, the third area may be an EL2 area on the first virtual machine, and the fourth area may be an EL0 area on the second virtual machine.

According to an embodiment disclosed in the disclosure, an operating method of an electronic device (e.g., an electronic device 101 of FIG. 1, an electronic device 801 of FIG. 8, or an electronic device 1001 of FIG. 10) may include running, by a processor (e.g., a processor 120 of FIG. 1) of the electronic device, a user application (e.g., an application 146 of FIGS. 1 and 2, an Android framework 310 of FIG. 3A or 3B, or a camera application 610 of FIG. 6) in a first area operating with a first permission, running, by the processor, an operating system (e.g., an OS 142 of FIGS. 1 and 2, an Android Linux kernel 320 of FIG. 3A or 3B, or a camera driver 620 of FIG. 6) in a second area operating with a second permission higher than the first permission, detecting, by the processor, an operation of at least one first device (e.g., a camera module 180 or an input module 150 of FIG. 1) included in the electronic device, in a third area operating with a third permission higher than the second permission, delivering, by the processor, a detection signal for the at least one first device to a fourth area included in a secure world (e.g., a secure world of FIG. 3A), an execution environment of which is separated from a normal world (e.g., a normal world of FIG. 3A) including the first area, the second area, and the third area, in the third area, and providing, by the processor, a notification that the at least one first device is operating using at least one specified second device (e.g., a display module 160, a haptic module 179, or an electronic device 102 of FIG. 1, a secure display 690 of FIG. 6, a display 760 of FIGS. 7A and 7B, a display 860 of FIG. 8), in the fourth area.

According to an embodiment disclosed in the disclosure, the processor may deliver the detection signal to the fourth area, through a fifth area operating with a permission higher than the third permission, in the third area. The fifth area may be an area where a secure monitor (e.g., a secure monitor 340 of FIG. 3A) assisting in switching between the normal world and the secure world is executed.

According to an embodiment disclosed in the disclosure, the first area may be an EL0 area of the normal world, the second area may be an EL1 area of the normal world, the third area may be an EL2 area of the normal world, the fourth area may be an EL0 area of the secure world, and the fifth area may be an EL3 area.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will also be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a memory;
a plurality of devices comprising circuitry; and
at least one processor, comprising processing circuitry, operatively connected with the memory and the plurality of devices, and configured to individually and/or collectively provide a first virtual machine providing a first execution environment, and a second virtual machine separate from the first virtual machine and providing a second execution environment,
wherein the first execution environment includes:
a first area operating with a first permission and where a user application is run;
a second area operating with a second permission higher than the first permission and where an operating system is run; and
a third area operating with a third permission higher than the second permission and where a hypervisor is run, and
wherein the second execution environment includes a fourth area where a secure application is run and which is separated from the first area, the second area and the third area,
wherein the memory stores instructions and wherein the instructions that, when executed individually and/or collectively by the at least one processor, cause the electronic device to:
detect, using the hypervisor, an operation of a first device which is predefined from among the plurality of devices;
deliver, to the secure application, a detection signal for indicating that the operation of the first device is detected; and
based on the detection signal, provide, using the secure application, a notification indicating the operation of the first device, and
wherein the notification is provided through a second device among the plurality of devices.

2. The electronic device of claim 1, further comprising:
a display, and
wherein the instructions that, when executed by the at least one processor cause the electronic device to:
display, through the display, a first user interface to define the first device and a second user interface to select the second device.

3. The electronic device of claim 1, wherein the memory includes an area to which the first device is mapped, and
wherein the instructions that, when executed by the at least one processor cause the electronic device to:
execute a read and/or write command delivered to the mapped area, in the first area and/or the second area; and
generate a trap to the third area based on the read and/or write command to detect the operation of the first device.

4. The electronic device of claim 1, wherein the at least one processor includes a normal world and a secure world separate from the normal world, and wherein the first virtual machine and the second virtual machine are provided on the normal world.

5. The electronic device of claim 1,
wherein the instructions that, when executed by the at least one processor, cause the electronic device to:
obtain, using the secure application, secure state information of the electronic device; and
determine the second device depending on a degree of security breach and/or change a method for providing the notification,
wherein the secure state information indicates a degree of security breach.

6. The electronic device of claim 1, wherein the instructions that, when executed by the at least one processor, cause the electronic device to:
determine whether to activate a detection function for first device;
deliver the detection signal based on determining that the detection function of the first device is activated; and
prevent to deliver the detection signal based on determining that the detection function of the first device is not activated.

7. The electronic device of claim 1, wherein the first area is an exception level (EL)0 area on the first virtual machine, the second area is an EL1 area on the first virtual machine, the third area is an EL2 area on the first virtual machine, and the fourth area is an EL0 area on the second virtual machine.

8. An electronic device, comprising:
a memory;
a plurality of devices comprising circuitry; and
at least one processor operatively connected with the memory and configured to provide a normal world providing a first execution environment, and a secure world separate from the normal world and providing a second an execution environment,
wherein the first execution environment includes:
a first area operating with a first permission and where a user application is run; and
a second area operating with a second permission higher than the first permission and where an operating system is run; and
a third area operating with a third permission higher than the second permission and where a hypervisor is run, and
wherein the second execution environment includes a fourth area where a secure application is run and which is separated from the first area, the second area and the third area,
wherein the memory stores instructions and wherein the instructions, when executed by the at least one processor cause the electronic device to:
detect, using the hypervisor, an operation of a first device which is predefined from among the plurality of devices;
deliver, to the secure application, a detection signal for indicating that the operation of the first device is detected; and
based on the detection signal, provide, using the secure application, a notification indicating the operation of the first device,
wherein the notification is provided through a second device among the plurality of devices.

9. The electronic device of claim 8, wherein the instructions that, when executed by the at least one processor cause the electronic device to:
deliver the detection signal through a fifth area operating with a permission higher than the third permission, and
wherein the fifth area is an area where a secure monitor assisting in switching between the normal world and the secure world is executed.

10. The electronic device of claim 9, wherein the first area is an exception level (EL)0 area of the normal world, the second area is an EL1 area of the normal world, the third area is an EL2 area of the normal world, the fourth area is an EL0 area of the secure world, and the fifth area is an EL3 area.

11. An operating method of an electronic device including a plurality of devices comprising circuitry and at least one processor configured to provide a first execution environment including a first area operating with a first permission and where a user application is run, a second area operating with a second permission higher than the first permission and where an operating system is run, a third area operating with a third permission higher than the second permission and where a hypervisor is run, and a second execution environment including a fourth area where a secure application is run and which is separated from the first area, second area and the third area, the operating method comprising:
detecting, using the hypervisor, an operation of a first device which is predefined from among the plurality of devices;
delivering, to the secure application, a detection signal for indicating that the operation of the first device is detected; and
based on the detection signal, providing, using the secure application, a notification indicating the operation of the first device,
wherein the notification is provided through a second device among the plurality of devices.

12. The operating method of claim 11, comprising displaying a first user interface to define the first device and a second user interface to select the second device through a display of the electronic device.

13. The operating method of claim 11, comprising executing a read and/or write command delivered to an area of a memory of the electronic device, the area to which the first device is mapped, in the first area and/or the second area and generates a trap to the third area based on the read or write command to detect the operation of the first device.

14. The operating method of claim 11, comprising obtaining secure state information of the electronic device using the secure application and provides the notification based on the obtained secure state information.

15. The operating method of claim 14, wherein the secure state information indicates a degree of security breach, and the method comprises determining the second device based on a degree of security breach or changes a method for providing the notification.

16. The operating method of claim 11, comprising: determining whether to activate a detection function for the first device, delivering a detection signal based on determining that the detection function of the first device is activated, and preventing to deliver the detection signal based on determining that the detection function of the first device is not activated.

17. The operating method of claim 11, wherein the first area is an exception level (EL)0 area on a first virtual machine, the second area is an EL1 area on the first virtual machine, the third area is an EL2 area on the first virtual machine, and the fourth area is an EL0 area on the second virtual machine.

18. An operating method of an electronic device including a plurality of devices comprising circuitry and at least one processor configured to provide a normal world providing a first execution environment a first area operating with a first permission and where a user application is run, a second area operating with a second permission higher than the first permission and where an operating system is run and a third area operating with a third permission higher than the second permission and where a hypervisor is run, and a secure world providing a second execution environment including a fourth area where a secure application is run and which is separated from the first area, a second area and the third area, the operating method comprising:
detecting, using the hypervisor, an operation of a first device which is predefined from among the plurality of devices;
delivering, to the secure application, a detection signal for indicating that the operation of the first device is detected; and
based on the detection signal, providing, using the secure application, a notification indicating the operation of the first device,
wherein the notification is provided through at least one second device among the at least one device.

19. The operating method of claim 18, comprising delivering the detection signal through a fifth area operating with a permission higher than the third permission, and
wherein the fifth area is an area where a secure monitor assisting in switching between the normal world and the secure world is executed.

20. The operating method of claim 19, wherein the first area is an EL0 area of the normal world, the second area is an EL1 area of the normal world, the third area is an EL2 area of the normal world, the fourth area is an EL0 area of the secure world, and the fifth area is an EL3 area.

* * * * *